(12) United States Patent
Boscher et al.

(10) Patent No.: US 8,139,763 B2
(45) Date of Patent: *Mar. 20, 2012

(54) RANDOMIZED RSA-BASED CRYPTOGRAPHIC EXPONENTIATION RESISTANT TO SIDE CHANNEL AND FAULT ATTACKS

(75) Inventors: Arnaud Boscher, Puteaux (FR); Elena Vasilievna Trichina, Munich (DE); Helena Handschuh, Pais (FR)

(73) Assignee: Spansion LLC, Sunnyvale, CA (US)

( * ) Notice: Subject to any disclaimer, the term of this patent is extended or adjusted under 35 U.S.C. 154(b) by 1194 days.

This patent is subject to a terminal disclaimer.

(21) Appl. No.: 11/870,102

(22) Filed: Oct. 10, 2007

(65) Prior Publication Data

US 2009/0097637 A1   Apr. 16, 2009

(51) Int. Cl.
*H04L 9/28* (2006.01)
(52) U.S. Cl. .................. 380/28; 380/30; 380/44; 726/2
(58) Field of Classification Search .................... 380/28, 380/30, 44; 726/2
See application file for complete search history.

(56) References Cited

U.S. PATENT DOCUMENTS

| | | | | |
|---|---|---|---|---|
| 7,676,037 B2 * | 3/2010 | Jung et al. | ........................ | 380/28 |
| 2004/0105541 A1 * | 6/2004 | Elbe et al. | ....................... | 380/28 |
| 2005/0084098 A1 * | 4/2005 | Brickell | .......................... | 380/28 |

FOREIGN PATENT DOCUMENTS

| WO | 9852319 A1 | 11/1998 |
|---|---|---|
| WO | 2006103341 A1 | 10/2006 |

OTHER PUBLICATIONS

Boneh, et al. "On the Importance of Eliminating Errors in Cryptographic Computations," Fumy, W., ed.: Advancesin Cryptology—EUROCRYPT '97, vol. 1233 of Lecture Notes in Computer Science, Springer, 1997. Last accessed Apr. 16, 2007, 17 pages.

Arnaud Boschner, et al. "CRT RSA Algorithm Protected Against Fault Attacks," Workshop in Information Security Theory and Practices, 2007: Smart Cards, Mobile and Ubiquitous Computing Systems. LNCS, vol. 4462, pp. 237-252, Springer-Verlag 2007. Last accessed Jul. 11, 2007, 15 pages.

Ciet, et al. "Practical Fault Countermeasures for Chinese Remaindering Based RSA," Workshop on Fault Diagonosis and Tolerance in Cryptography—FDTC '05, 2005. Last accessed Apr. 17, 2007, 18 pages.

Fumaroli, et al. "Blinded Fault Resistant Exponentiation," Workshop on Fault Diagnosis and Tolerance in Cryptography—FDTC '06, http://eprint.iacr.org, 2005. Last accessed Apr. 17, 2007, 9 pages.

(Continued)

*Primary Examiner* — Thanhnga Truong
(74) *Attorney, Agent, or Firm* — Turocy & Watson, LLP

(57) ABSTRACT

Systems and/or methods that facilitate secure electronic communication of data are presented. A cryptographic component facilitates data encryption, data decryption, and/or generation of digital signatures, associated with messages. The cryptographic component includes a randomized exponentiation component that facilitates decryption of data and/or generation of digital signatures by exponentiating exponents associated with messages. A random number is generated and utilized to randomize the value of a message. After an exponentiation is performed on the randomized message value, intermediate results can be analyzed to determine if there was error in the exponentiation. If there was no error in the exponentiation, a final value of the exponentiation is determined and provided as output as decrypted data or a digital signature; if there is error, an "error" output can be provided.

20 Claims, 11 Drawing Sheets

OTHER PUBLICATIONS

Giraud. "Fault Resistance RSA Implementation," Workshop on Fault Diagnosis and Tolerance in Cryptography—FDTC '05, 2005. Last accessed Apr. 17, 2007, 88 pages.

Kocher. "Timing Attacks on Implementation of Diffie-Hellman, RSA, DSS, and Other Systems," Advances in Cryptology—FDTC '96, vol. 1109 if Lecture Notes in Computer Science, 1996. Last accessed Apr. 17, 2007, 10 pages.

Kocher, et al. "Differential Power Analysis," Advances in Cryptology—CRTYO '99, vol. 1666 of Lecture Notes in Computer Science. Last accessed Apr. 17, 2007, 10 pages.

Yen, et al. "Checking Before Output May Not Be Enough Against Fault-Based Cryptanalysis," IEEE Transactions on Computers 49, 2000. Last accessed Apr. 17, 2007, 5 pages.

E. Trichina, et al. "Implementation of Elliptic Curve Cryptosystems with build-in countermeasures against side-channel attacks". In Cryptographic Hardware and Embedded Systems (CHES'02). Lecture Notes in Computer Science, vol. 2523 (2002).

Stamatis Karnouskos, et al. Mobile Payment: A Journey Through Existing Procedures and Standardization Initiatives, IEEE Communication Surveys, vol. 6, No. 4, 2004, p. 44-66. http://www.comsoc.org/livepubs/surveys/public/2004/oct/index.html. Last accessed Feb. 3, 2008, 23 pages.

Nina Kreyer, et al. Characteristics of Mobile Payment Procedures, M-Services, 2002. http://sunsite.informatik.rwth-aachen.de/Publications/CEUR-WS/Vol-61/paper1.pdf. Last accessed Feb. 3, 2008, 13 pages.

K. Linck, et al. Security Issues in Mobile Payment from the Customer View Point. In: Proc. 14th Int. European Conf. on Information Systems (ECIS), Goeteborg, Sweden, 2006. MPRA Paper No. 2923, posted Nov. 7, 2007. http://mpra.ub.uni-muenchen.de/2923/1/MPRA_paper_2923.pdf. Last accessed Feb. 3, 2008, 12 pages.

Risks and Threads Analysis and Security Best Practices. Mobile 2-Way Messaging Systems, v 1.0, 2002. http://www.mobilepaymentforum.org/documents/Risk_and_Threats_Analysis_and_Security_Best_Practices_Mobile_2_Way_Messaging_December_2002.pdf. Last accessed Feb. 3, 2008, 49 pages.

Jan Ondrus, et al. A Disruption Analysis in the Mobile Payment Market. Proceedings of the 38th Hawaii International Conference on System Sciences—2005. 0-7695-2268-8/05. http://csdl2.computer.org/comp/proceedings/hicss/2005/2268/03/22680084c.pdf. Last accessed Feb. 3, 2008, 10 pages.

Antti Partanen, et al. Fineid S1—Electronic ID Application, v. 2.1, Population Register Center of Finland, Helsinki, Finland, 2004. http://www.vrk.fi/vrk/fineid/files.nsf/files/4A6480742C01D98BC2257054002A1D23/$file/S1v21.pdf. Last accessed Feb. 3, 2008, 34 pages.

WAP-210-WAPArch-20010712 Wireless Application Protocol Forum Ltd. (2001) Finland 24 pages.

WAP-260-WIM-20010712—a Wireless Identity Module, Part: Security (2001) 105 pages.

WAP-217-WPKI Wireless Application Protocol Public Key Infrastructure (2001) 46 pages.

3GPP Specification Detail https://www.3gpps.org/ftp/Spec/html/1114.htm last viewed Feb. 8, 2008, 3 pages.

The Java Community Process (JRSs):Java Specification requests http://www.jcp.org/en/jrs/detail?id=177 last viewed Feb. 8, 2008, 5 pages.

Mobile Transactions—SMS Payment for Your Web Site http://www,mobiletransactions.org/ last viewed Feb. 8, 2008, 1 page.

Mobey Forum http://www.mobeyforum.org/ last viewed Feb. 8, 2008, 1 page.

Niina Mallat, et al. Merchant Adoption of Mobile Payment Systems. Proceedings of the International Conference on Mobile Business (ICMB'05), 0-7695-2367-6/05 IEEE. http:Meeexplore.ieee.org/iel5/9999/32116/01493631.pdf?tp=&arnumber=1493631&isnumber=32116. Last accessed Feb. 22, 2008, 7 pages.

Seema Nambiar, et al. Analysis of Payment Transaction Security in Mobile Commerce. 0-7803-8819-410 IEEE http://ieeexplore.ieee.org/iel5/9790/30875/01431506.pdf?tp=&arnumber=1431506&isnumber=30875. Last accessed Feb. 22, 2008, 6 pages.

A. Vilmos, et al. SEMOPS: Design of a New Payment Service. Proceedings of the 14th International Workshop on Database and Expert Systems Applications (DEXA'03), 1529-4188/03 $17.00 © 2003 IEEE. http:Meeexplore.ieee.org/iel5/8719/27592/01232130.pdf?tp=&arnumber=1232130&isnumber=27592. Last accessed Feb. 22, 2008, 5 pages.

\* cited by examiner

RANDOMIZED RSA-BASED CRYPTOGRAPHIC EXPONENTIATION RESISTANT TO SIDE CHANNEL AND FAULT ATTACKS

BACKGROUND

Electronic communication of information has become commonplace. Today, information, including sensitive information, regarding individuals, businesses, and other entities, can be communicated electronically between devices. For example, computers, cellular phones, smart cards, and other electronic devices can be utilized to electronically communicate information between users. Further, devices, like smart cards, can be utilized to provide a digital signature or other authentication information that can reasonably identify the user of the smart card and can provide certain information regarding the user and/or can enable the user to sign electronic documents (e.g., legal documents) in a secure manner.

With regard to the electronic communication of sensitive information, encryption/decryption techniques can be utilized to protect such information from being accessed by undesired persons (e.g., attackers, hackers). For example, public key encryption can be utilized to secure information electronically communicated between devices. For example, when sending a message, an entity can utilize a public key, which can be published and made available to users, to encrypt the message data. The encrypted message can be sent to a recipient, who can utilize a private key, which can be known to the recipient but not others, so that the encrypted message data can be decrypted and the message can be perceived in a usable form.

However, undesired persons can take measures to attempt to learn or decrypt secure data and/or the private key that was used to encrypt the data. For example, attackers can attempt to collect side-channel information (e.g., power consumption information, electromagnetic information, fault information, etc.) associated with a device when executing a cryptographic process in order to learn the private key or other security measures utilized to secure the data. Attacks using such side-channel information can include simple power analysis (SPA) attacks, differential power analysis (DPA) attacks, differential fault analysis (DFA) attacks, and electromagnetic analysis (EMA) attacks, for example. When such undesired persons gain unauthorized and undesired access to the information of a user, it can result in financial hardship, emotional hardship, and/or other harm to the user.

It is therefore desirable to maintain the security of information communicated electronically, including securing data from side-channel attacks. Further, while countermeasures can be employed to minimize the risk of unauthorized access to information, it is desirable that such countermeasures be manageable on electronic devices, including portable electronic devices (e.g., cellular phones, smart cards).

SUMMARY

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The disclosed subject matter relates to systems and/or methods that facilitate securing information, such as information communicated electronically. In accordance with one aspect of the disclosed subject matter, a cryptographic component can be employed to encrypt and/or decrypt data to facilitate securing electronically communicated information, for example, with regard to communication of information associated with Rivest, Shamir, and Adleman (RSA) cryptography.

In accordance with one aspect of the disclosed subject matter, the cryptographic component can include a randomized exponentiation component that employs a cryptographic exponentiation algorithm (e.g., right-to-left square-and-multiply algorithm also referred to herein as right-to-left algorithm) to exponentiate a received message using an exponent to facilitate decrypting data and/or generating a digital signature, for example. The randomized exponentiation component can generate and/or utilize a random number that can be employed to randomize the message during exponentiation of the message data to facilitate securing the message and associated exponent from being discovered by attackers via side-channel attacks.

In accordance with one aspect of the disclosed subject matter, the cryptographic component can also perform a results value check after the exponentiation calculations have been performed to determine whether there is a fault or error in the exponentiation. If there is no error in the exponentiation, a final result, which can have a value based on the inverse value of the random number, can be provided as an output. Such output can be the decrypted data and/or a digital signature, for example. If there is an error or fault, an "error" can be provided as an output where "error" can indicate there was an error fault in the exponentiation; or alternatively, no output is provided. The results value check can facilitate securing the data from fault attacks, for example.

In accordance with another aspect of the disclosed subject matter, the randomized exponentiation component can employ a Chinese Remainder Theorem (CRT) in conjunction with RSA cryptography to facilitate improving performance with regard to the exponentiation of message data, for example, when generating a digital signature associated with the message. The randomized exponentiation component can employ right-to-left exponentiation to facilitate exponentiation associated with the message data. To facilitate data security, the randomized exponentiation component can also employ a random number that can be utilized to randomize the value of the message data being exponentiated. Further, after the calculations associated with the CRT-RSA algorithm have been performed, the randomized exponentiation component can perform a results value check of certain variables associated with the exponentiation to determine whether there is an error or a fault in the exponentiation. If there is no fault or error in the exponentiation, then the randomized exponentiation component can provide a final result, which can have a value based on the modular inverse of the random number, as an output. Such output can be a decrypted message and/or digital signature, for example. If there is a fault or an error with the exponentiation, then the randomized exponentiation component can provide an output of "error" or alternatively can provide no output.

In accordance with an aspect of the disclosed subject matter, the randomized exponentiation component can employ a computation component that can be comprised of one or more computation subcomponents that can perform the respective computations associated with exponentiation algorithms (e.g., right-to-left-square-and-multiply-type algorithms, CRT-type algorithms). As such, by utilizing more than one computation subcomponent, the randomized exponentiation component can perform calculations associated with the exponentiation of message data in parallel, which can yield results in a more time-efficient manner and can provide additional data security, as parallel operations can confuse an attacker attempting a side-channel attack in an attempt to discover the exponent and/or the message data.

The following description and the annexed drawings set forth in detail certain illustrative aspects of the disclosed subject matter. These aspects are indicative, however, of but a few of the various ways in which the principles of the innovation may be employed and the disclosed subject matter is intended to include all such aspects and their equivalents. Other advantages and distinctive features of the disclosed subject matter will become apparent from the following detailed description of the innovation when considered in conjunction with the drawings.

DETAILED DESCRIPTION

Figure 1:
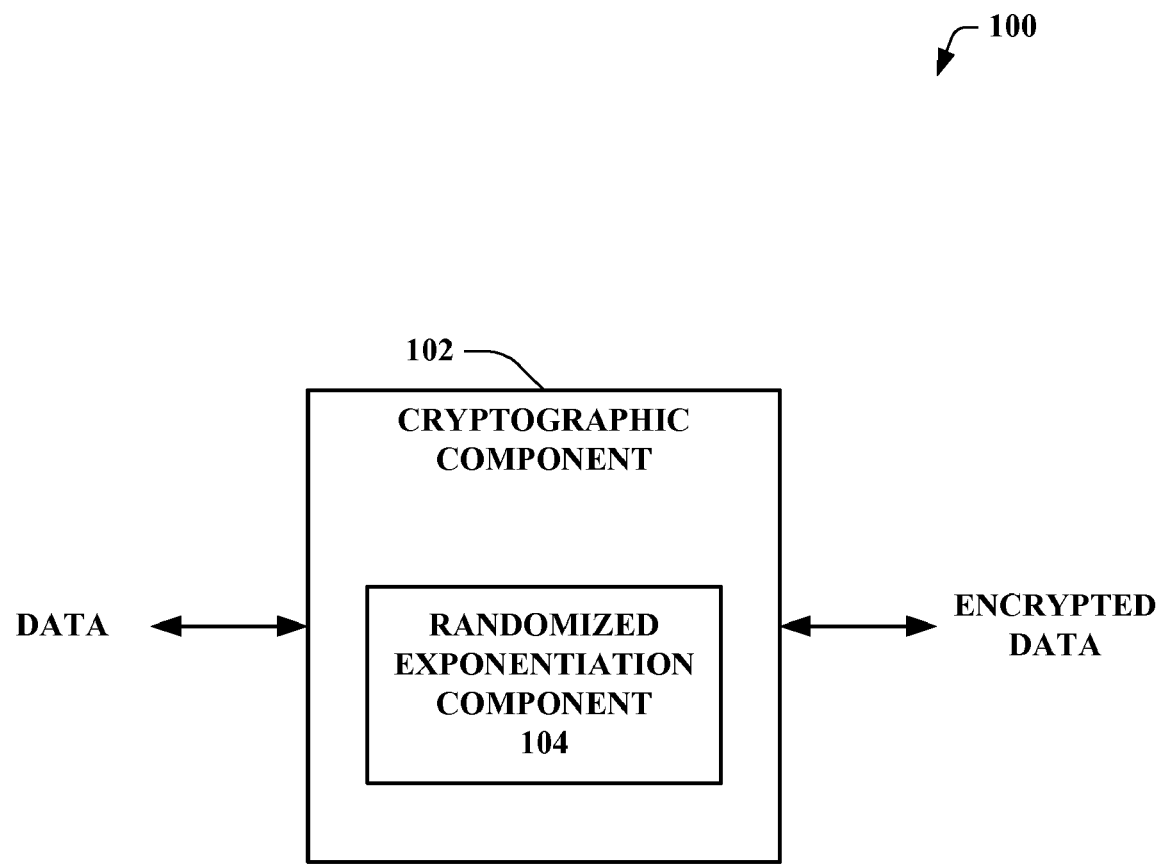
FIG. 1 illustrates a block diagram of a system that facilitates secure electronic communication of data in accordance with an aspect of the subject matter disclosed herein.

The disclosed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the disclosed subject matter may be practiced without these specific details. In other instances, well-known structures and devices are shown in block diagram form in order to facilitate describing the subject innovation.

Electronic communication of information, including sensitive information, has become commonplace. Security in the communication of such information is paramount, as such information can be related to personal information of a user, financial information of a user, etc. Encryption and decryption of data can be performed to facilitate secure communication of data. For example, Rivest, Shamir, and Adleman (RSA) cryptography can be employed to facilitate encryption/decryption of data and/or facilitate generation of a digital signature associated with a user, where public keys and private keys associated with a user can be utilized to facilitate encryption/decryption of the data and/or digital signatures. However, attackers can attempt to collect side-channel information (e.g., information related to simple power consumption, electromagnetic analysis, and/or faults) associated with the cryptography in order to decipher the exponent, message data, and/or the cryptographic process.

Systems and/or methods are presented that facilitate secure electronic communication of data. A cryptographic component can be employed that can include a randomized exponentiation component that can utilize a generated random number to facilitate randomizing a message during exponentiation of the message to facilitate securing the data. In accordance with one aspect, the randomized exponentiation component can employ a right-to-left square-and-multiply algorithm (also referred to herein as a right-to-left algorithm or Russian Peasant algorithm), or a variation thereof, to facilitate exponentiation of the message data with the exponent associated with the message. During exponentiation of the message, the value of the message data can be multiplied by the random number and/or the random number can be utilized to modify the message data to facilitate obfuscating the data values from attackers who attempt to learn the exponent and/or message data. In accordance with another aspect, a results value check can be performed to facilitate determining whether the exponentiation was performed without error, where the results of the exponentiation can be provided as an output if there is no error, or no output or an output of "error" can be provided if there was an error in the exponentiation thereby securing data from fault attacks.

In accordance with another aspect of the disclosed subject matter, the randomized exponentiation component can employ an algorithm based on the Chinese Remainder Theorem (CRT) to facilitate efficient exponentiation of the message, for example, to facilitate generation of a digital signature. The randomized exponentiation component can also employ message randomization through use of a random number and/or a results value check in conjunction with an RSA-CRT algorithm to facilitate securing data from side-channel attacks and/or fault attacks.

Turning to FIG. 1, illustrated is a system 100 that facilitates securing electronic communication of data associated with electronic communications in accordance with the disclosed subject matter. For example, system 100 can be associated with the electronic communication of information in accordance with cryptographic protocols (e.g., RSA cryptography, ECC, Diffie-Hellman cryptography, Digital Signature Algorithm (DSA) cryptography, and/or Elliptic Curve DSA cryptography, etc.). System 100 can include a cryptographic component 102 that can facilitate encrypting and decrypting data associated with electronic communications. The cryptographic component 102 can also facilitate generation of a digital signature that can be associated with a message (e.g., electronic document). For example, a smart card, which can include the cryptographic component 102, can be employed to facilitate generating the digital signature. The cryptographic component 102 can receive data and can encrypt it and provide the encrypted data, for example, to be stored in memory (not shown) or transmitted to another device or component (not shown). The cryptographic component 102 can also receive encrypted data and can facilitate decrypting such data and providing the decrypted data, for example, to a processor (not shown), interface (not shown), and/or other component so that it can be utilized and/or perceived.

The cryptographic component 102 can include a randomized exponentiation component 104 that can facilitate randomizing the message (e.g., encrypted data) during exponentiation (e.g., modular exponentiation) of the message data to facilitate security of the data from attack (e.g., side-channel attack). Randomizing the message, for example, by multiplying the binary value of the message by a random number value and/or otherwise modifying the message value by using a random number value, can facilitate securing the message data, the exponent, and/or the cryptographic process from being discovered by hackers via side-channel attacks, as such message randomization can result in de-correlation of power curves from processed data thereby rendering side-channel information (e.g., power consumption information, electromagnetic behavior information) virtually useless to an attacker.

For instance, a message can be encrypted using a public key associated with a user. The encrypted message can be sent to the user, where the data encryption can facilitate securing the data so that other persons besides the user are not able, or are virtually unable, to access or decipher the original message. After the user receives the encrypted message, the user can utilize a private key, which can be associated with an exponent, and the cryptographic component 102 and/or the randomized exponentiation component 104 can utilize the private key and associated exponent to facilitate decrypting the encrypted message, so that the message can be perceived by the user in a usable form.

Given an m-bit exponent associated with a message, the randomized exponentiation component 104 can facilitate generating and/or receiving a randomly generated number (e.g., binary number with a value ranging from 0 to $2^{1024}-1$). The randomly generated number can be generated in a secure manner so as to reduce or minimize discovery of such number by an attacker. Further, the random number can be different for each exponentiation execution on message data. The randomized exponentiation component 104 can facilitate randomizing and/or modifying the message data based on the randomly generated number. For example, the binary value of the message data can be multiplied by the binary value of the random number to facilitate randomizing the exponentiation of the message data. The randomized exponentiation component 104 can exponentiate the randomized message in accordance with an algorithm (e.g., right-to-left algorithm). Once the randomized message data has been exponentiated with the exponent, the preliminary results can be analyzed to determine whether there was an error or fault in the exponentiation, as more fully described herein. If there was no error in the exponentiation, a preliminary result associated with the decrypted data and/or digital signature can be modified based on the random number value (e.g., by multiplying the value of such preliminary result by the inverse of the random number value) to reach a final result of the exponentiation, where the final result can be the decrypted data or digital signature, for example, and can be provided as output.

In accordance with another aspect of the disclosed subject matter, the randomized exponentiation component 104 can facilitate securing the data from fault attacks be employing a results value check before an output is provided to determine whether there was an error or a fault during the exponentiation of the data. If there is an error during the exponentiation, it is possible that such error can be the result of an attacker attempting to force a fault in order to discover information regarding the data and/or exponent. The randomized exponentiation component 104 can compare a combined value of certain variables based on the original message value, to another variable value based on repeated squaring of the original message value throughout the exponentiation of the data in order to determine whether such combined value is equivalent to the value of the other variable. If such values are equivalent, then the exponentiation was performed without error and the final result (e.g., decrypted data, digital signature) can be provided as an output. If, however, such values are not equivalent, then there was an error during exponentiation, and, instead of providing the final result as output, an "error" message can be provided as an output, or alternatively, there can be no output provided.

In accordance with an aspect of the disclosed subject matter, a message g and an exponent d containing m bits (e.g., 1024 bits, 2048 bits, . . .) of data, which can be in binary form, can be received by the randomized exponentiation component 104. The randomized exponentiation component 104 can receive and/or generate a random number R (e.g., a binary number ranging from 0 to $2^{1024}-1$). The random number R can be utilized to set an initial value for a variable R0 (e.g., R0=R), and the inverse of the random number can be utilized to set an initial value for a variable R1 (e.g., R1=R^(-1)). Further, another variable, A, can be set to the value of the message g. The randomized exponentiation component 104 can perform right-to-left exponentiation of the exponent, where the exponent bits can be scanned from d(0) to d(m-1). When the exponent bit is equal to a 1, the exponentiation component can utilize the value of R0 for the current iteration, where R0 can be initially set to the value of the random number, and can multiply the variable A by R0, which can then be the new value for R0. When the exponent bit is equal to a 0, the randomized exponentiation component 104 can utilize the value of R1 for the current iteration, where R1 can be initially set to the value of the inverse of the random number, and can multiply the variable A by R1, which can then be the new value for R1. The calculations can be continued until all iterations are complete such that all bits of the exponent have been scanned. Once the calculations have been performed with regard to all of the bits of the exponent, the exponentiation component can facilitate determining whether the calculations are free of error, which can facilitate protecting the data and exponent from fault attacks. For example, the exponentiation component can determine whether the value of the product of R0\*R1\*g is equivalent to the value of variable A for the last iteration. If so, the exponentiation component can provide an output, which can be the value of the product of the R0\*R^(-1), where R0 can be the value of R0 for the last iteration, and can have a value of $g^d$, where the received input of the exponentiation component is a message g and an exponent d. The output can be a decrypted message and/or a digital signature, for example. However, if the value of the product of R0\*R1\*g is not equivalent to the value of variable A, then the exponentiation component can determine that there was a fault or an error in the exponentiation and the cryptographic component can provide an output of "error" or alternatively can provide no output, for example.

For example, the randomized exponentiation component 104 can exponentiate with an exponent d in accordance with a Binary Right-To-Left SPA/DPA/DFA-Resistant Exponentiation algorithm. The randomized exponentiation component 104 can receive a message g, an m-bit exponent d associated therewith and a random number R, and can determine an output y, as more fully described in the example code below.

---

Binary Right-to-Left SPA/DPA/DFA-Resistant Exponentiation Algorithm.

---

Input: message g, m-bit exponent d represented in binary form, d=(d_{m-1}, ..., d_0)2
Output: $y=g^d$
    /* Initialization*/
    R0 = R;
/* R can be a random value that can be different for each algorithm execution */
    R1 = R^(−1);
    A = g;
    for (i=0 to m−1) do
    {
        if(d_i=1) then R0=R0*A;
    else        R1=R1*A;
        A = $A^2$;
    }
    /* Return result */
    If (R0*R1*g = = A)    /* This test can check that variables are error free */
        Return R0*R^(−1)
    Else
        Return "Error"

---

The returned value, R0*R^(−1), can be the output value $y=g^d$, which can be the decrypted data and/or represent a digital signature of a user, for example. The other variables R1 and A can have values as follows: R1=R^(−1)*g^(not(d)) and A=g^(2^m), or alternatively A=g^(2^m), where not(d) can represent the binary complement of d. As the random number can be different for each exponentiation execution and can be generated in a secure manner so as to be virtually undiscoverable by an attacker, the randomization of the value of the received message through the use of the random number value can facilitate resisting side-channel attacks, as the power consumption and electromagnetic behavior associated with the exponentiation can be altered thereby rendering the power curve and electromagnetic behavior information virtually useless to an attacker. Performing a results value check to ensure that the exponentiation was performed correctly and providing the final result of the exponentiation only when the exponentiation is without error can facilitate securing the data from fault attacks.

In accordance with another aspect of the disclosed subject matter, the Binary Right-To-Left SPA/DPA/DFA-Resistant Exponentiation algorithm can be modified so that during initialization R0=R^(−1) and R1=R. The bits of the exponent can be scanned, and calculations can be performed in accordance with such algorithm.

---

Modified Binary Right-to-Left SPA/DPA/DFA-Resistant Exponentiation Algorithm.

---

Input: message g, m-bit exponent d represented in binary form, d=(d_{m-1}, ..., d_0)2
Output: $y=g^d$
    /* Initialization*/
    R0 = R^(−1);

---

Modified Binary Right-to-Left SPA/DPA/DFA-Resistant Exponentiation Algorithm.

---

/* R can be a random value that can be different for each algorithm execution */
    R1 = R;
    A = g;
    for (i=0 to m−1) do
    {
        if(d_i=1) then R0=R0*A;
    else        R1=R1*A;
        A = $A^2$;
    }
    /* Return result */
    If (R0*R1*g = = A)    /* This test can check that variables are error free */
        Return R0*R
    Else
        Return "Error"

---

The returned result can then be R0*R and can be the output value $y=g^d$. Such output can be the decrypted data and/or represent a digital signature of a user that can be associated with the message g, for example.

In accordance with one aspect, the modular inverse of the random number (e.g., R^(−1)) can be computed using an Extended Euclide Algorithm. The computation of the modular inverse of the random number using an Extended Euclide Algorithm can be virtually negligible in computation expense as compared the exponentiation algorithm.

In accordance with another aspect, a Montgomery algorithm can be employed in conjunction with the right-to-left algorithm to facilitate efficient computations associated with the random number value and the inverse of the random number value. For example, Montgomery multiplication, which can be denoted by , can have the following property: 11=T^(−1), where T can be a value involved in the Montgomery algorithm (T=2^n where n can be the bit-length of the modulus). Thus, by generating a small random value k (e.g., 32 bits), the random value R and its inverse (e.g., R^(−1)) can be efficiently computed: R=T^^k and R=(1**1)^^k (where ^^ can denote Montgomery exponentiation).

In accordance with yet another aspect of the disclosed subject matter, the randomized exponentiation component 104 can employ ECC-based algorithms to facilitate encryption/decryption of data and/or generation of digital signatures to facilitate securing data. When employing ECC, the exponentiation algorithm(s) can be effectively and equivalently replaced with point multiplications. In other words, instead of raising an integer g to the power d in order to obtain the result $y=g^d$, a point P on an elliptic curve over a finite field can be multiplied by an integer d in order to obtain a point Q=d.P. Thus, a traditional right-to-left exponentiation algorithm can be transposed into a right-to-left point multiplication algorithm in which the bits of the integer d can be scanned from right to left, in accord with the particular ECC algorithm, and a double and add multiplication approach can be used instead of the square and multiply approach employed for exponentiation. In accordance with the disclosed subject matter, the randomized exponentiation system(s) and/or method(s) can be regular and/or modular exponentiation algorithms and/or point multiplication algorithms on an Elliptic Curve.

In accordance with still another aspect of the disclosed subject matter, the cryptographic component 102 can employ a CRT-RSA-based algorithm to facilitate efficient exponentiation of a received message to facilitate, for example, generation of a digital signature associated with the message. The CRT-RSA-based algorithm can also include a right-to-left algorithm component to facilitate secure exponentiation. The randomized exponentiation component 104 can receive a message M and a CRT key (e.g., exponent) associated therewith that can be comprised of p, q, dp=d mod q−1, dq=d mod q−1, Apq=p^(−1) mod q, for example, where p and q can be sub-moduli of a modulus N, such that N=p*q, and dp, dq, and Apq can be variables associated with the CRT algorithm that can facilitate performance of the calculations in accordance with the CRT algorithm.

The randomized exponentiation component 104 can exponentiate the message data with the exponent, or sub-moduli associated therewith. Once the calculations associated with the CRT-RSA algorithm and/or right-to-left algorithm have been performed, the randomized exponentiation component 104 can facilitate determining whether the exponentiation was performed without error or fault. For example, the randomized exponentiation component 104 can compare the combined value of the message value multiplied by certain variable values with the preliminary result of another certain variable associated with the CRT algorithm to determine whether the combined value associated with the message and the value of the other variable are equivalent. If such values are equivalent, then the cryptography component 102 can provide the final value, which can be a digital signature, for example, as an output, as the equivalency can indicate that the exponentiation was performed without error. If such values are not equivalent, then that can be an indication that there was an error during exponentiation of the message, and the cryptographic component 102 can provide "error" as an output to facilitate preventing a potential attacker from obtaining results regarding the faulty exponentiation in order to learn information regarding the exponent and/or message data.

For instance, the randomized exponentiation component 104 can exponentiate with an exponent in accordance with a DFA-Resistant CRT-RSA algorithm that can utilize a Binary Right-To-Left SPA/DFA-Resistant Exponentiation algorithm. The randomized exponentiation component 104 can receive a message M and a CRT key, and can determine an output S1, which can be a digital signature, for example, as more fully described in the example code below:

---
DFA-Resistant CRT RSA Algorithm using Binary Right-to-Left SPA/DFA-Resistant Exponentiation Algorithm
---

Input: message M, CRT key (p, q, dp = d mod p−1, dq = d mod q−1, Apq = p^(−1) mod q)
Output: S=M^d mod N (N = p*q)
  Sp1 = M^dp mod p;                        //First Exponentiation
  Sp2 = M^(not(dp)) mod p;
  Sp3 = M^(2^(length(p))) mod p;
  Sq1 = M^dq mod q;                       //Second Exponentiation
  Sq2 = M^(not(dq)) mod q;
  Sq3 = M^(2^(length(q))) mod q;
  S1 = ((Sq1 − Sp1)*Apq mod q) * p + Sp1;   //Recombination Step
  S2 = ((Sq2 − Sp2)*Apq mod q) * p + Sp2;
  S3 = ((Sq3 − Sp3)*Apq mod q) * p + Sp3;
  If (M*S1*S2 mod N == S3)
    Return S1
  Else
    Return "Error"

---

In the above example, where the results value check indicates that the value of M*S1*S2 mod N is equivalent to the value of S3, then the value for S1 can be provided as an output where S1 can have a value of M^d mod N (N=p*q), which can be the digital signature associated with the input message M, for example. Where the value of M*S1*S2 mod N is not equivalent to the value of S3, then the "error" can be provided as an output, since there was an error or a fault in the exponentiation of the message.

In accordance with still another aspect of the disclosed subject matter, the cryptographic component 102 can employ message randomization in conjunction with a DPA/DFA-Resistant CRT-RSA-based algorithm to facilitate secure and efficient exponentiation of a received message to facilitate, for example, generation of a digital signature associated with the message. The CRT-RSA-based algorithm can also include a right-to-left algorithm component to facilitate secure exponentiation in order to protect data and/or the exponent from side-channel attacks. The randomized exponentiation component 104 can receive a message M and a CRT key (e.g., p, q, dp=d mod q−1, dq=d mod q−1, Apq=p^(−1) mod q). The variables p and q can be sub-moduli of a modulus N, such that N=p*q. The randomized exponentiation component 104 can generate and/or receive a random number R, which can be a binary number (e.g., ranging in value from 0 to 2^1024−1), for example. The randomized exponentiation component 104 can randomize the value of the message data by multiplying the value of the message by the value of the random number and/or otherwise modifying the value of the message data with the random number.

The randomized exponentiation component 104 can exponentiate the randomized message data with the exponent, or sub-moduli associated therewith. Once the calculations associated with the CRT-RSA algorithm and/or right-to-left algorithm have been performed, the randomized exponentiation component 104 can facilitate determining whether the exponentiation was performed without error or fault, for example, by comparing the combined value of the original message value multiplied by certain variable values with the preliminary result of another certain variable associated with the CRT algorithm to determine whether the combined value associated with the message and the value of the other variable are equivalent. If such values are equivalent, then that can be an indication that the exponentiation results are correct, and the cryptographic component 102 can provide the final value, which can be a digital signature, for example, as an output. If such values are not equivalent, then that can be an indication that there was an error or fault during exponentiation of the message, and the cryptographic component 102 can provide "error" as an output to facilitate preventing the output of detailed fault information that can possibly be retrieved by an attacker.

In accordance with one aspect, the randomized exponentiation component 104 can exponentiate data utilizing an exponent in accordance with a DPA/DFA-Resistant CRT-RSA algorithm that can utilize a Binary Right-To-Left SPA/DPA/DFA-Resistant Exponentiation algorithm. The randomized exponentiation component 104 can receive a message M and a CRT key, and can determine an output S1*R^(−1) mod N, which can be a digital signature, for example, as more fully described in the example code below:

---
DPA/DFA-Resistant CRT RSA Algorithm using Binary Right-to-Left SPA/DPA/DFA-Resistant Exponentiation Algorithm
---

Input: message M, CRT key (p, q, dp = d mod p−1, dq = d mod q−1, Apq = p^(−1) mod q)
Output: S=M^d mod N (N = p*q)
  R = rand( );
  Sp1 = R*M^dp mod p;                     //First Exponentiation
  Sp2 = R^(−1)*M^(not(dp)) mod p;
  Sp3 = M^(2^(length(p))) mod p;

-continued

DPA/DFA-Resistant CRT RSA Algorithm using Binary Right-to-Left
SPA/DPA/DFA-Resistant Exponentiation Algorithm

```
Sq1 = R*M^dq mod q;                        //Second Exponentiation
Sq2 = R^(-1)*M^(not(dq)) mod q;
Sq3 = M^(2^(length(q))) mod q;
S1 = ((Sq1 - Sp1)*Apq mod q) * p + Sp1;    //Recombination Step
S2 = ((Sq2 - Sp2)*Apq mod q) * p + Sp2;
S3 = ((Sq3 - Sp3)*Apq mod q) * p + Sp3;
If ( M*S1*S2 mod N == S3)
    Return S1*R^(-1) mod N
Else
    Return "Error"
```

With regard to the above example code, where the value of M*S1*S2 mod N is equivalent to the value of S3, then the randomized exponentiation component 104 can provide the value of S1*R^(-1) mod N as an output, where the output can have a value of $M^d$ mod N (N=p*q), and can be a digital signature associated with the input message M, for example. Thus, where there is no error in the exponentiation, S1 can have a value of R*M^d mod N, S2 can have a value of R^(-1)*M^(2^(bitlength(N))-d-1) mod N, and S3 can have a value of M^(2^(bitlength(N)) mod N. Where the value of M*S1*S2 mod N is not equivalent to the value of S3, then the "error" can be provided as an output, since there was an error or a fault in the exponentiation of the message.

In another aspect, the randomized exponentiation component 104 can exponentiate data using an exponent in accordance with an alternative DPA/DFA-Resistant CRT-RSA algorithm that can utilize a Binary Right-To-Left SPA/DPA/DFA-Resistant Exponentiation algorithm. The randomized exponentiation component 104 can receive a message M and a CRT key, and can determine an output S1*R mod N, which can be a digital signature, for example, as more fully described in the example code below.

Alternative DPA/DFA-Resistant CRT RSA Algorithm using Binary
Right-to-Left SPA/DPA/DFA-Resistant Exponentiation Algorithm

```
Input: message M, CRT key (p, q, dp = d mod p-1, dq = d mod q-1,
Apq = p^(-1) mod q)
Output: S=M^d mod N (N = p*q)
    R = rand( );
    Sp1 = R^(-1)*M^dp mod p;               //First Exponentiation
    Sp2 = R*M^(not(dp)) mod p;
    Sp3 = M^(2^(length(p))) mod p;
    Sq1 = R^(-1)*M^dq mod q;               //Second Exponentiation
    Sq2 = R*M^(not(dq)) mod q;
    Sq3 = M^(2^(length(q))) mod q;
    S1 = ((Sq1 - Sp1)*Apq mod q) * p + Sp1;  //Recombination Step
    S2 = ((Sq2 - Sp2)*Apq mod q) * p + Sp2;
    S3 = ((Sq3 - Sp3)*Apq mod q) * p + Sp3;
    If ( M*S1*S2 mod N == S3)
        Return S1*R mod N
    Else
        Return "Error"
```

In regard to the above example code, where the value of M*S1*S2 mod N is equivalent to the value of S3, then the randomized exponentiation component 104 can provide the value of S1*R mod N as an output, where the output can have a value of $M^d$ mod N (N=p*q), and can be a digital signature associated with the input message M, for example. Thus, where there is no error in the exponentiation, S1 can have a value of R^(-1)*M^d mod N, S2 can have a value of R*M^(2^(bitlength(N))-d-1) mod N, and S3 can have a value of M^(2^(bitlength(N)) mod N. Where the value of M*S1*S2 mod N is not equivalent to the value of S3, then the "error" can be provided as an output, since the inequivalency can indicate that there was an error or a fault in the exponentiation of the message.

In accordance with still another aspect of the disclosed subject matter, the randomized exponentiation component 104 can include a computation component (e.g., modular multiplication accelerator) (not shown) that can be comprised of one or more computation subcomponents (e.g., multiply-accumulate units) (not shown) that can each perform the respective computations associated with the exponentiation (e.g., utilizing right-to-left-based algorithm, CRT-based algorithm, and/or ECC-based algorithm, etc.). In accordance with one aspect, calculations associated with an algorithm (e.g., DFA-Resistant CRT-RSA algorithm using Binary Right-to-Left SPA/DFA-Resistant Exponentiation Algorithm, DPA/DFA-Resistant CRT-RSA Algorithm using Binary Right-to-Left SPA/DPA/DFA-Resistant Exponentiation Algorithm) can be performed independent of each other during exponentiation of the message with the exponent. As such, where all or a portion of the calculations associated with an exponentiation of a message can be performed independently, more than one computation subcomponent can be employed to facilitate performing calculations in parallel, which can yield results in a more time-efficient manner and can provide additional data security, as parallel operations can facilitate obfuscating results of power consumption analysis and/or electromagnetic analysis thereby facilitating securing the data from attacks based on such analyses. The randomized exponentiation component 104 can facilitate controlling the computation subcomponents and other components (e.g., memory (not shown)) to control the exponentiation process.

In accordance with yet another aspect of the disclosed subject matter, when performing the exponentiation of the exponent, the randomized exponentiation component 104 can employ other countermeasures, such as utilizing an atomic version of computation algorithms (e.g., atomic version of right-to-left exponentiation algorithm), for example.

Figure 2:
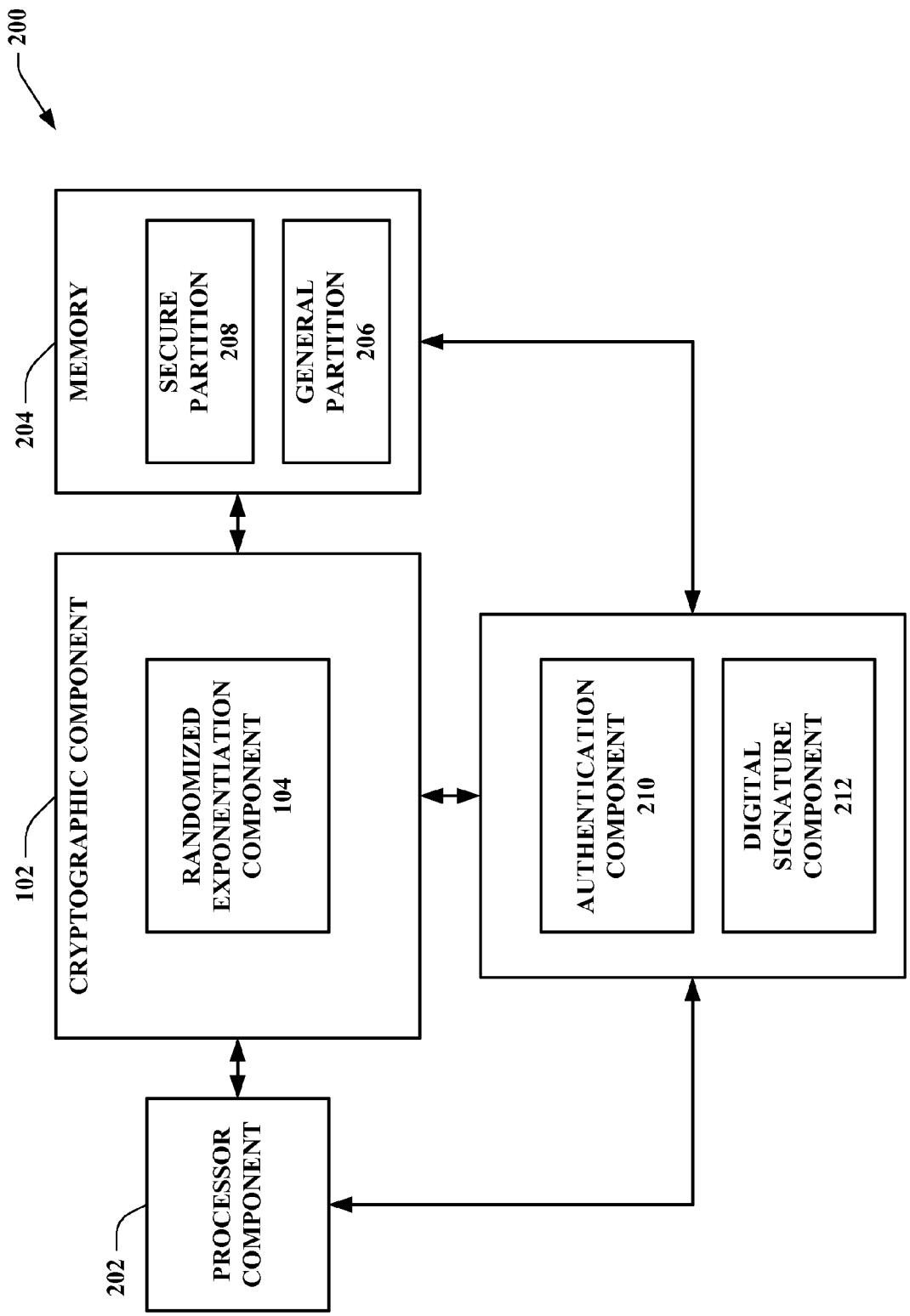
FIG. 2 illustrates a block diagram of another system that facilitates secure electronic communication of data in accordance with an aspect of the subject matter disclosed herein.

Referring to FIG. 2, a block diagram of a system 200 that facilitates securing the electronic communication of data in accordance with the disclosed subject matter is illustrated. For example, system 200 can be associated with the electronic communication of information in accordance with cryptographic protocols (e.g., RSA cryptography, ECC, Diffie-Hellman cryptography, Digital Signature Algorithm (DSA) cryptography, and/or Elliptic Curve DSA cryptography). System 200 can include a host processor 202 that can be associated with a cryptographic component 102. In accordance with one embodiment of the disclosed subject matter, the host processor 202 can be a typical applications processor that can manage communications and run applications. For example, the host processor 202 can be a processor that can be utilized by a computer, a mobile handset, personal data assistant (PDA), or other electronic device. In accordance with another embodiment of the disclosed subject matter, the host processor 202 can be a microprocessor (e.g., 16-bit microprocessor) that is of a size such that the host processor 202 can be utilized in a smart card or other small electronic device and can manage electronic communication of information, run applications, and/or process data associated with the smart card or other small electronic device. The host processor 202 can generate commands, including read, write, and/or erase commands, in order to facilitate reading data from, writing data to, and/or erasing data from memory 204.

The cryptographic component 102 can facilitate encrypting data being written to memory 204 and/or decrypting data being read from memory 204, and/or can facilitate generating a digital signature associated with a user(s). The cryptographic component 102 can include a randomized exponentiation component 104 that can employ randomization in the exponentiation of a received message (e.g., encrypted data) to facilitate decrypting the data being read from memory 204 and/or generating a digital signature in a secure manner such that the risk of attacks (e.g., side-channel attacks, fault attacks) in an attempt to discover the data and/or the exponent associated with the data can be reduced or minimized. The cryptographic component 102 and randomized exponentiation component 104 can each include such functionality as described herein with respect to such components, for example, with regard to system 100.

The memory 204 can facilitate storing data being written to memory 204 and accessing data being read from memory 204. The memory 204 can be partitioned into a desired number of partitions, and, for example, can include a general partition 206 and a secure partition 208. The general partition 206 can store and/or provide data, including data for which general access is desired. The secure partition 208 can store data for which a heightened level of security is desired. For example, the secure partition 208 can store information such as information associated with a private key(s) (e.g., secret key or data) of an entity (e.g., user) associated with the electronic device.

It is to be appreciated that the memory 204 can be, for example, either volatile memory or nonvolatile memory, or can include both volatile and non-volatile memory. By way of illustration, and not limitation, non-volatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The memory 204 of the subject systems and methods is intended to comprise, without being limited to, these and any other suitable types of memory. In addition, it is to be appreciated that the memory 204 can be a server, a database, a hard drive, and the like.

Cryptographic component 102 can also provide asymmetric cryptographic accelerators and tools (e.g., RSA, Digital Signature Standard (DSS), and the like) to ensure that a specified partition in memory 204, or portions thereof, are only accessed by those entities that are authorized and certified to do so. Additionally, cryptographic component 102 can provide accelerators and tools (e.g., Secure Hash Algorithm (SHA) and its variants such as, for example, SHA-0, SHA-1, SHA-224, SHA-256, SHA-384, and SHA-512) to ensure that access to the specified partition in memory 204 is confined to those entities authorized to gain access.

System 200 can further include an authentication component 210 that can solicit authentication data from an entity, and, upon the authentication data so solicited, can be employed, individually and/or in conjunction with information acquired and ascertained as a result of biometric modalities employed, to facilitate control access to the memory 204. The authentication data can be in the form of a password (e.g., a sequence of humanly cognizable characters), a pass phrase (e.g., a sequence of alphanumeric characters that can be similar to a typical password but is conventionally of greater length and contains non-humanly cognizable characters in addition to humanly cognizable characters), a pass code (e.g., Personal Identification Number (PIN)), and the like, for example. Additionally and/or alternatively, public key infrastructure (PKI) data can also be employed by authentication component 210. PKI arrangements can provide for trusted third parties to vet, and affirm, entity identity through the use of public keys that typically can be certificates issued by the trusted third parties. Such arrangements can enable entities to be authenticated to each other, and to use information in certificates (e.g., public keys) and private keys, session keys, Traffic Encryption Keys (TEKs), cryptographic-system-specific keys, and/or other keys, to encrypt and decrypt messages communicated between entities.

The authentication component 210 can implement one or more machine-implemented techniques to identify an entity by its unique physical and behavioral characteristics and attributes. Biometric modalities that can be employed can include, for example, face recognition wherein measurements of key points on an entity's face can provide a unique pattern that can be associated with the entity, iris recognition that measures from the outer edge towards the pupil the patterns associated with the colored part of the eye—the iris—to detect unique features associated with an entity's iris, and finger print identification that scans the corrugated ridges of skin that are non-continuous and form a pattern that can provide distinguishing features to identify an entity.

System 200 can further include a digital signature component 212 that can facilitate generation of a digital signature associated with an entity, where the digital signature can be associated with an electronic document, for example. A private key(s) (e.g., signature key(s)) can be associated with an associated digital signature(s) and can be stored in the secure partition 208 in memory 204. The private key(s) associated with the digital signature can be accessed from the secure partition 208 in memory 204 upon the presentation of authentication information that can identify the entity seeking to access such private key and demonstrates that the entity is authorized to access such private key.

Figure 3:
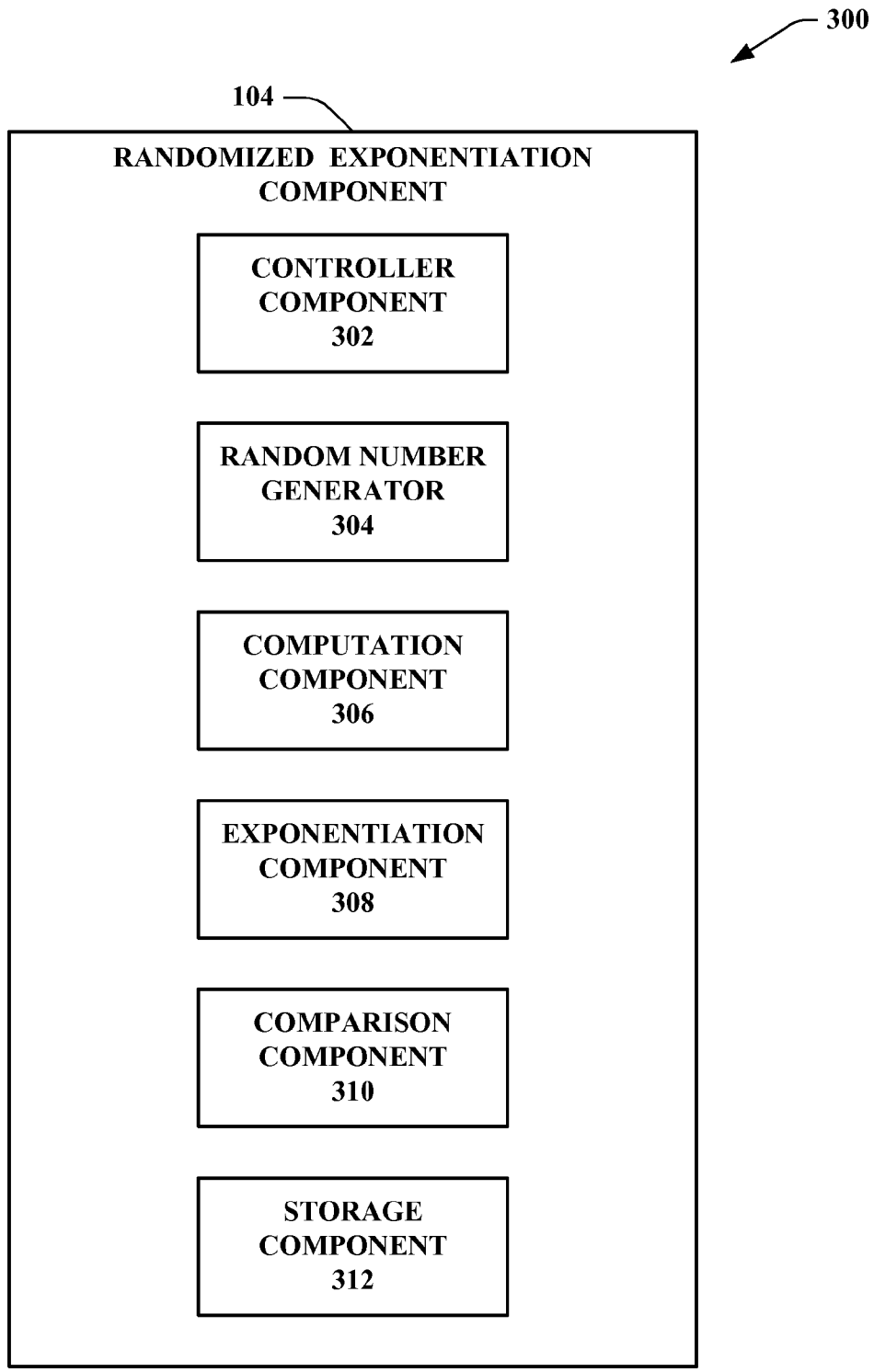
FIG. 3 is a block diagram illustrating a randomized exponentiation component in accordance with an aspect of the subject matter disclosed herein.

Turning to FIG. 3, illustrated is a block diagram of a system 300 that employs message randomization to facilitate securing data in accordance with the disclosed subject matter. The randomized exponentiation component 104 can include such functionality as described herein, for example, with regard to system 100 and/or system 200. Randomized exponentiation component 104 can include a controller component 302 that can facilitate controlling the execution of exponentiation of exponents as well as controlling the access to data in memory (e.g., 204) (not shown). The controller component 302 can also facilitate selecting the type of exponentiation (e.g., right-to-left-type exponentiation, right-to-left type of exponentiation employing CRT, etc.) to be performed.

Randomized exponentiation component 104 can also include a random number generator 304 that can facilitate generating a random number(s) that can be utilized to facilitate randomizing the exponentiation of the data (e.g., message) with the exponent to facilitate security of the data. For example, the random number generator can generate a random number. The random number can be employed to modify the value of a received message and/or another variable(s) associated with the exponentiation algorithm to facilitate randomizing the exponentiation of the message data. The random number can be different each time an exponentiation is performed. In accordance with one aspect of the disclosed subject matter, the random number generator 304 can be a true random number generator that can generate a random number in a secure manner to reduce or minimize discovery of the random number by an attacker.

Randomized exponentiation component 104 can further include a computation component 306 that can perform calculations associated with exponentiation of data (e.g., exponent) to facilitate decrypting data and/or generating a digital signature based on the type of exponentiation(s) being performed. For example, the computation component 306 can be a modular multiplication/exponentiation accelerator. In accordance with one aspect of the disclosed subject matter, the computation component 306 can be comprised of one or more computation subcomponents such that there can be more than one multiply-accumulate unit that can perform calculations associated with exponentiation of an exponent. For example, if two computation subcomponents are employed, calculations associated with the exponentiation of data with an exponent that are independent of each other can be performed in parallel. To further illustrate, where a right-to-left algorithm is employed with conjunction with a CRT algorithm (e.g., DPA/DFA-Resistant CRT RSA Algorithm using Binary Right-to-Left SPA/DPA/DFA-Resistant Exponentiation Algorithm), all or a portion of the calculations related to the exponentiation of the message can be performed independently, and as a result, the computation component 306 can employ more than one computation subcomponent to perform parallel calculations related to the exponentiation of the message with the exponent. The controller component 302 can facilitate controlling access to memory and data as well as controlling the execution of the calculations associated with the exponentiation. Performing the exponentiation calculations in parallel can be an effective countermeasure, as the risk of an attack can be reduced or minimized because such parallel operations can make it difficult to obtain sufficient power analysis information. In addition, parallel operations can result in an exponentiation(s) being performed in a more time-efficient manner.

The randomized exponentiation component 104 can include an exponentiation component 308 that can be comprised of respective pieces of code that can each be utilized to facilitate performing respective types of exponentiation. By way of example, and not limitation, the types of exponentiation that can be performed include right-to-left (e.g., Russian Peasant) exponentiation, and/or atomic Russian Peasant exponentiation, any of which can further be utilized in conjunction with the CRT. The pieces of code can be stored in storage component 312, for example.

Randomized exponentiation component 104 can also include a comparing component 310 that can facilitate comparing received values to perform a results value check to facilitate securing data from attacks (e.g., fault attacks). For example, after the exponentiation computations have been performed, the comparing component 310 can receive a value which can be a combined value of the original message value multiplied by one or more intermediary variables (e.g., R0*R1*A for a Right-to-Left SPA/DFA-Resistant Exponentiation Algorithm), which can be compared with a value of another variable (e.g., A for the Right-to-Left SPA/DFA-Resistant Exponentiation Algorithm) associated with the exponentiation and received by the comparing component 310. The comparing component 310 can compare the respective received values to determine whether the exponentiation was performed without error, or whether there was an error or a fault in the exponentiation. If the compared values are equivalent, then it can be determined that the exponentiation was performed without error. However, if the compared values are not equivalent, then it can be determined that at least one error or fault occurred in the exponentiation.

Randomized exponentiation component 104 can further include a storage component 312 that can be comprised of volatile memory (e.g., RAM) and non-volatile memory (e.g., ROM). For example, the volatile memory of storage component 312 can be utilized to store exponent values, initial variable values, random number values, and/or temporary, partial, and/or final results of calculations associated with exponentiation of exponents, decryption of data, and/or generation of a digital signature. As further example, the non-volatile memory of the storage component 312 can be utilized to store pieces of code respectively associated with the different types of exponentiation that can be performed in accordance with the disclosed subject matter.

Figure 4:
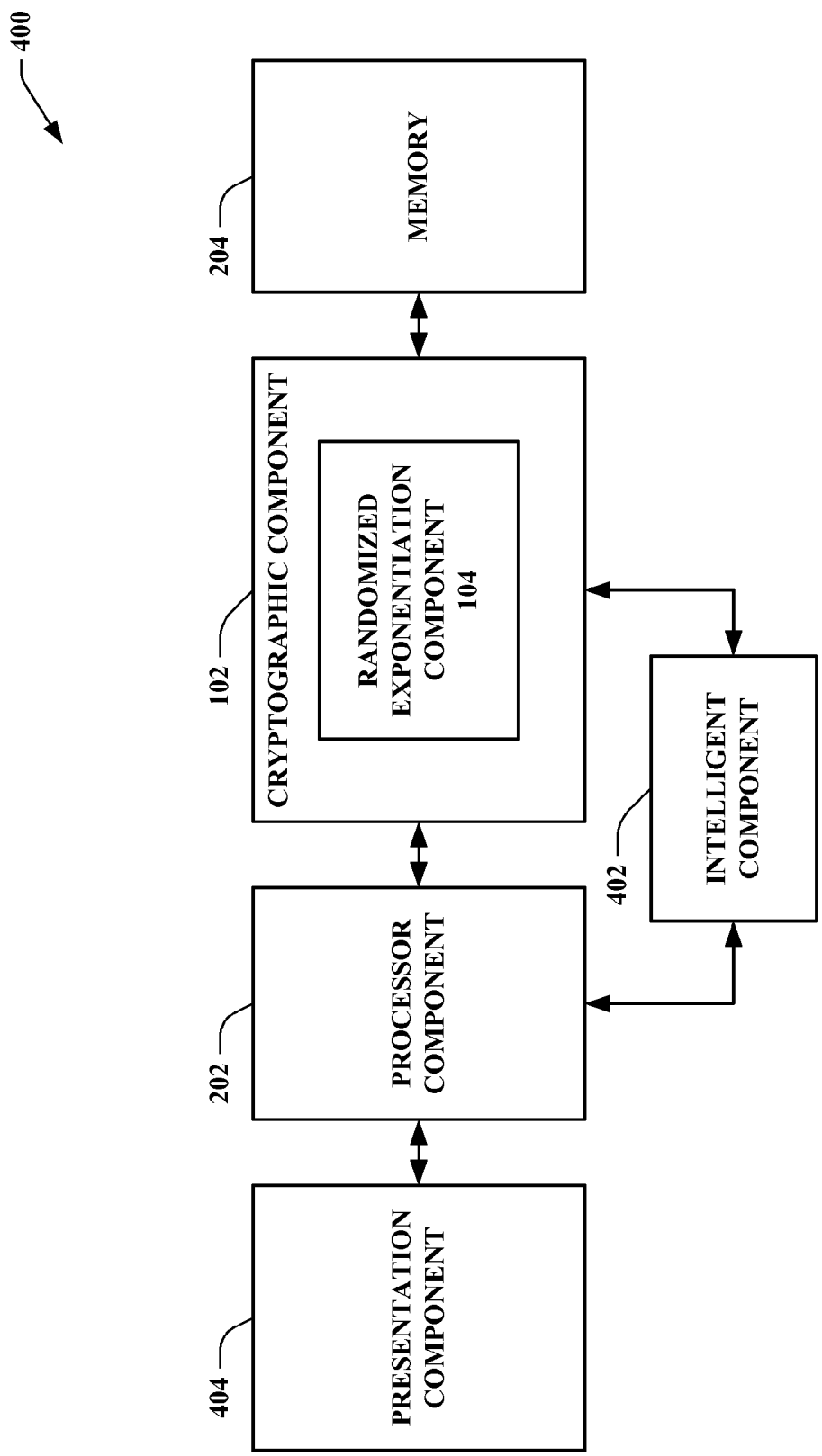
FIG. 4 depicts a block diagram of a system that employs intelligence to facilitate secure electronic communication of data in accordance with the disclosed subject matter.

Referring to FIG. 4, depicted is a system 400 that can employ intelligence to facilitate securing data and/or generating digital signatures in accordance with the disclosed subject matter. System 400 can include a host processor 202, cryptographic component 102, randomized exponentiation component 104, and memory 204 that each can be substantially similar to respective components and can include such respective functionality as described herein, for example, with regard to system 100, system 200, and/or system 300.

The system 400 can further include an intelligent component 402. The intelligent component 402 can be utilized by the cryptographic component 102, including the randomized exponentiation component 104, to facilitate analyzing data and can make an inference and/or a determination regarding, for example, a type of exponentiation algorithm to be employed to exponentiate a message, whether an exponentiation of a message has been performed without error, whether to provide data results as an output, whether to request authentication or re-authentication of a user, etc.

For example, the intelligent component 402 can infer whether an exponentiation of a message has been performed without error. As further example, if an error occurred, or if it is inferred that an error occurred, during the exponentiation of a message, the intelligent component 402 can infer whether a user is to re-authenticate before further data encryption/decryption and/or digital signature generation can be performed.

It is to be understood that the intelligent component 402 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data (e.g., historical data), whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . .) can be employed in connection with performing automatic and/or inferred action in connection with the disclosed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

System 400 also can include a presentation component 404, which can be associated with the host processor 202. The presentation component 404 that provides various types of user interfaces to facilitate interaction between a user and any component coupled to the host processor 202. As depicted, the presentation component 404 is a separate entity that can be utilized with the host processor 202 and associated components. However, it is to be appreciated that the presentation component 404 and/or similar view components can be incorporated into the host processor 202 and/or a stand-alone unit. The presentation component 404 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled to and/or incorporated into the host processor 202.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Further, the presentation component 404 can include or can be associated with a scanner that can receive data (e.g., decrypted data, digital signature) from other components (e.g., host processor 202) of system 400. The scanner can be a type whereby a device (e.g., smart card) containing the data can be swiped through the scanner, which can read data associated with the device and/or the scanner can be a wireless scanner (e.g., radio-frequency identification (RFID)-type scanner) that can receive or read data associated with a device that contains the data when the device is within a predefined area near the wireless scanner such that the wireless scanner is able to communicate with the device to read or receive the data from the device.

System 100, system 200, system 300, and/or system 400, or portions thereof, can be employed in virtually any electronic device where security of data is desired. Examples of such electronic devices can include a computer, a cellular phone, a digital phone, a video device (e.g., video playing and/or recording device), a smart card, a personal digital assistant (PDA), a television, an electronic game (e.g., video game), a digital camera, an electronic organizer, an audio player and/or recorder, an electronic device associated with digital rights management, Personal Computer Memory Card International Association (PCMCIA) cards, trusted platform modules (TPMs), Hardware Security Modules (HSMs), set-top boxes, secure portable tokens, Universal Serial Bus (USB) tokens, key tokens, secure memory devices with computational capabilities, devices with tamper-resistant chips, and the like.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

FIGS. 5-9 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 5:
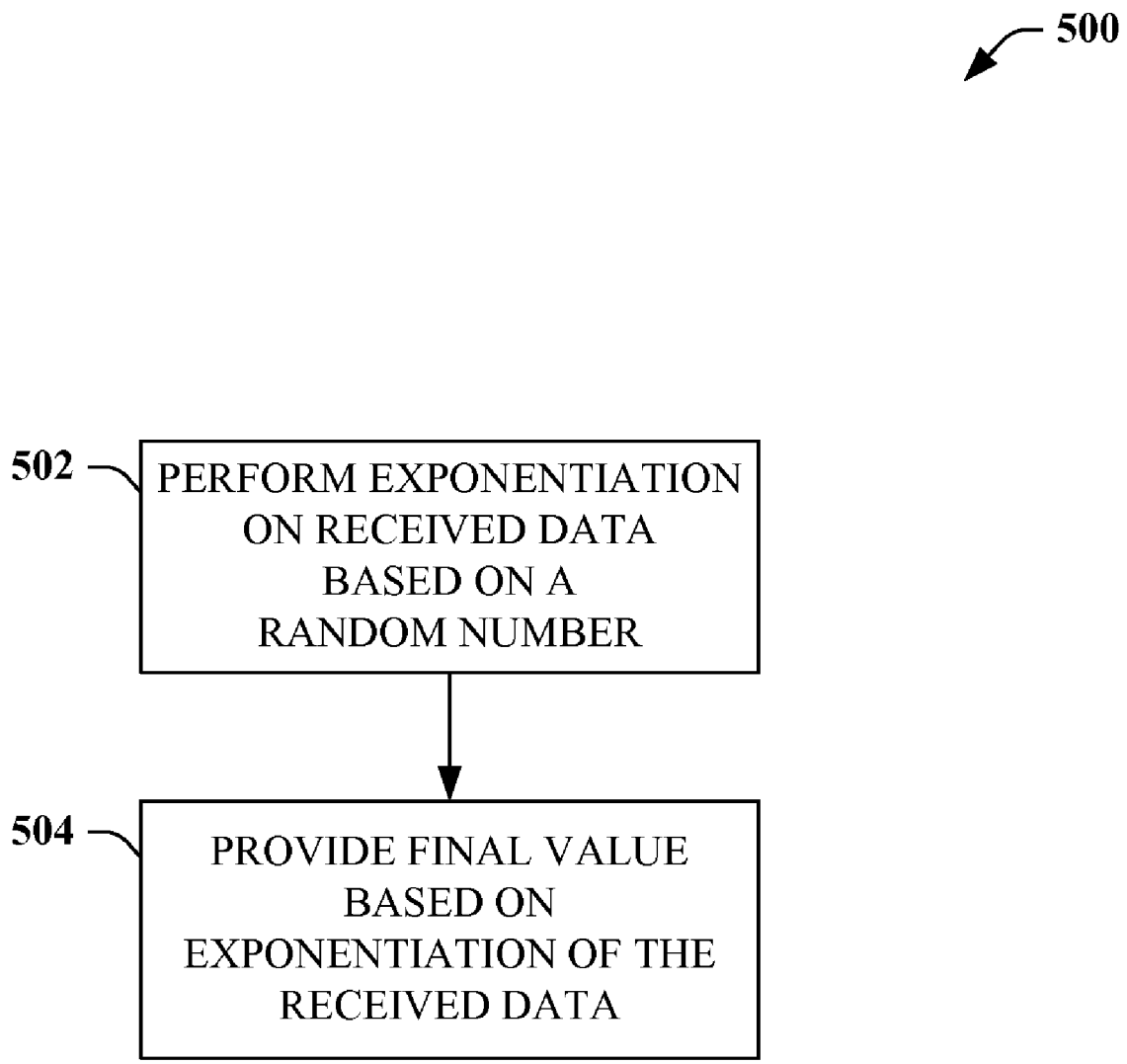
FIG. 5 illustrates a methodology that employs randomized exponentiation to facilitate secure electronic communication of data in accordance with an aspect of the disclosed subject matter.

Referring to FIG. 5, a methodology 500 that facilitates modular exponentiation of data is illustrated. The exponentiation can be with regard to a message (e.g., encrypted data) that can be associated with an exponent that can be in binary form. At 502, the message can be exponentiated with the exponent based on a random number. For example, the value of the message can be randomized and/or modified by multiplying the message value and/or a value of a variable(s) associated therewith by the value of the random number and/or the value of the inverse of the random number. The random number can be generated by a random number generator, for example, and can be generated in a secure manner by the randomized exponentiation component 104 or can be received in a secure manner by the randomized exponentiation component 104. Further, the random number can be different for each exponentiation execution. The randomization of the message value and/or the variable value(s) associated therewith can facilitate securing the data and the exponent from being detected through side-channel attacks, for example.

In accordance with an aspect of the disclosed subject matter, the randomized exponentiation component 104 can employ various types of exponentiation algorithms to facilitate exponentiation of the message with the exponent. Exponentiation algorithms that can be employed can include the right-to-left algorithm, and/or an atomic version of computation algorithms (e.g., atomic version of right-to-left algorithm, and/or high radix (e.g., radix 4) right-to-left algorithm), for example. Further, exponentiation algorithms that employ the CRT can be implemented by the randomized exponentiation component 104. In addition, the randomized exponentiation component 104 can employ ECC-based algorithms to facilitate encryption/decryption of data (e.g., message) and/or generation of digital signatures to facilitate securing data.

At 504, a final value based on the exponentiation of the data can be provided as an output. The final value can be based on a modular inverse of the random number. Where the message is g and the exponent is d, for example, the output value can have a value equal to $g^d$. The output value can be decrypted data and/or a digital signature associated with a user, for example. At this point, methodology 500 can end.

Figure 6:
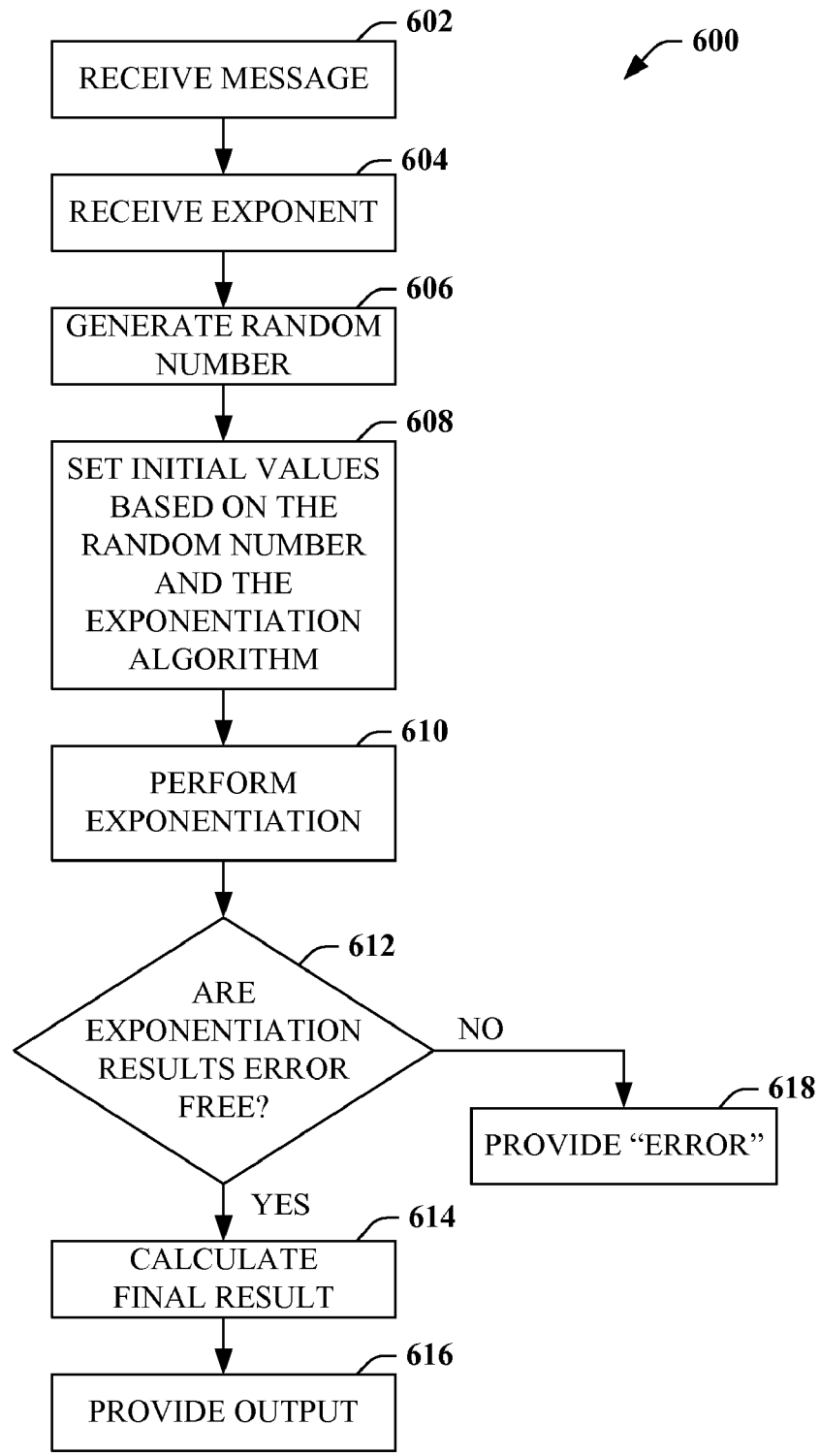
FIG. 6 depicts another methodology that employs randomized exponentiation to facilitate data security in accordance with an aspect of the disclosed subject matter.

FIG. 6 depicts a methodology 600 that can employ randomization of data to facilitate secure modular exponentiation of data. At 602, a message can be received, where the message can be in the form of binary data, for example. At 604, an exponent that can be associated with the message can be received. The exponent can be comprised of m bits (e.g., 1024 bits, 2048 bits, . . .), for example. At 606, a random number can be generated. The random number can be generated by a random number generator, for example, and can be generated in a secure manner by the randomized exponentiation component 104 or can be received in a secure manner by the randomized exponentiation component 104. The random number can be different for each exponentiation execution.

At 608, initial values can be set or selected to facilitate performing a right-to-left-based exponentiation (e.g., Russian Peasant exponentiation). For example, the initial value for a portion of the variables associated with the right-to-left algorithm can be the random number value and/or a value equivalent to a value of the message modified (e.g., multiplied) by the random number value. In accordance with an aspect of the disclosed subject matter, the CRT algorithm can be employed in conjunction with the exponentiation algorithm (e.g., right-to-left algorithm) to facilitate efficient exponentiation of the received message. Initial values of certain variables associated with the CRT algorithm also can be set or selected at 608.

At 610, an exponentiation can be performed on the message data utilizing the exponent, where the exponentiation can be based on the right-to-left algorithm, for example. In accordance with one aspect of the disclosed subject matter, the CRT can be employed in conjunction with the right-to-left algorithm. Employing the CRT can result in the exponentiation being computationally more efficient and can facilitate securing the data.

At 612, a portion of the results of the exponentiation can be a compared to each other to determine whether the exponentiation of the message was performed without error or a fault. If it is determined that there is no error or fault with the exponentiation of the message with the exponent, then, at 614, the final result of the exponentiation can be calculated or determined. The final result can be based on the modular inverse of the random number. For example, where the exponentiation of message is performed where the message is randomized by multiplying the message value with the random number value, the final result can be calculated by using the exponentiation result (e.g., R0 when exponentiating with the Binary Right-to-Left SPA/DPA/DFA-Resistant Exponentiation Algorithm, S1 when exponentiating with the DFA-Resistant CRT-RSA Algorithm using Binary Right-to-Left SPA/DFA-Resistant Exponentiation Algorithm) and multiplying that result by the modular inverse of the random number (e.g., R^(−1)) to obtain a final result of the exponentiation. At 616, the final result can be provided as an output. The final result can be decrypted data associated with the message and/or a digital signature related to the message, for example.

However, if, at 612, it is determined that there was an error or a fault in the exponentiation of the message, then, at 618, an output of "error" can be provided. Performing a results value check to compare a certain portion of the results of the exponentiation can facilitate reducing the risk of a fault attack in an attempt to discover the exponent and/or the data and can thereby facilitate securing the data (e.g., message, exponent). At this point, methodology 600 can end.

Figure 7:
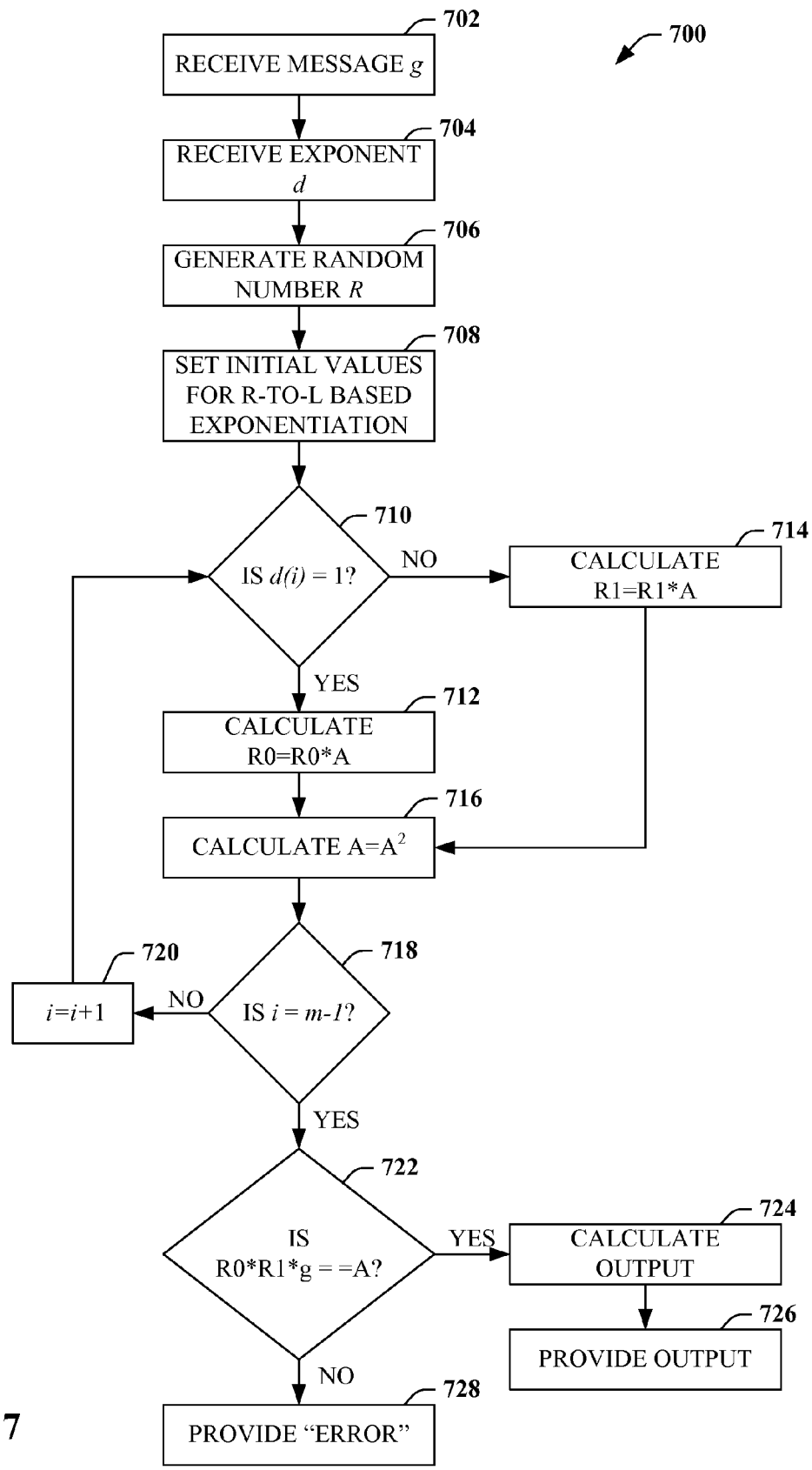
FIG. 7 illustrates a methodology that employs randomized exponentiation to facilitate secure electronic communication of data in accordance with one embodiment of the subject matter disclosed herein.

Turning to FIG. 7, a methodology 700 that employs randomization of data to facilitate modular exponentiation of data is illustrated. At 702, a message g can be received, where the message can be in the form of binary data, for example. At 704, an exponent d that can be associated with the message can be received. The exponent can be comprised of m bits (e.g., 1024 bits, 2048 bits, . . .), for example. At 706, a random number R can be generated. The random number R can be generated by a random number generator, for example, and can be generated in a secure manner by the randomized exponentiation component 104 or can be received in a secure manner by the randomized exponentiation component 104. The random number can be different for each exponentiation execution. At 708, initial values can be set or selected to facilitate performing a right-to-left exponentiation (e.g., Russian Peasant exponentiation). For example, the initial values for certain variables can be set as R1=R^(−1), A=g, and i=0.

At 710, a determination can be made as to whether the portion of the exponent at the value of the exponent bit d(i) for the current iteration is a 0 or 1, that is, a determination can be made as to whether d(i)=1. If the exponent bit is a 1, at 712, a calculation can be performed to calculate R0=R0*A, and methodology 700 can proceed to reference numeral 716. If, at 710, the exponent bit is a 0, a calculation can be performed to calculate R1=R1*A, and methodology 700 can proceed to reference numeral 716. At 716, a calculation can be performed to calculate $A=A^2$.

At 718, a determination can be made as to whether the iteration number i is equal to m−1. If it is determined that the iteration number i is not equal to m−1, then at 720, the iteration number i can be incremented by 1, and methodology 700 can be returned to reference numeral 710. If, however, at 718, it is determined that the iteration number i=m−1, then, at 722, a determination can be made as to whether the value of R0*R1*g is equivalent to the value of A. If it is determined that the value of R0*R1*g is equivalent to the value of A, there is no error in the exponentiation, and then at 724, the value of the output can be calculated, for example, as Output=R0*R^(−1). When there is no error in the exponentiation, the other variables R1 and A can have values as follows: R1=R^(−1)
*g^(not(d)) and A=g^(2^m), where not(d) can represent the
binary complement of d.

At 726, the value of the Output can be provided, where the
output can be the decrypted data or a digital signature associated with the received message g, for example. Where the
message is g and the exponent is d, the value of the output can
be $g^d$, for example.

If, however, at reference numeral 722, it is determined that
R0*R1*g is not equivalent to the value of A, then at 728, an
"error" can be provided as output. The results check at reference numeral 722 can facilitate protecting the data and associated exponent from fault attacks by preventing data from
being output when there is an error in the exponentiation of
the data. At this point, methodology 700 can end.

In accordance with another aspect of the disclosed subject
matter, certain initial values associated with methodology
700 can be modified so that during initialization, at reference
numeral 708, the initial values for R0 and R1 can alternatively
be set as follows: R0=R^(−1) and R1=R. Methodology 700
can proceed from reference numeral 708 through reference
numeral 722, where the acts respectively associated therewith
can be performed as described hereinabove. If, at 722, it is
determined that the value of R0*R1*g is equivalent to the
value of A, then at 724, the value of the output can be calculated, for example, as Output=R0*R. At 726, the value of the
Output can be provided, where the value of the Output can be
$g^d$, given a message g and an exponent d, for example. The
Output can be the decrypted data or a digital signature associated with the received message g. Methodology 700 can end
at this point.

Figure 8:
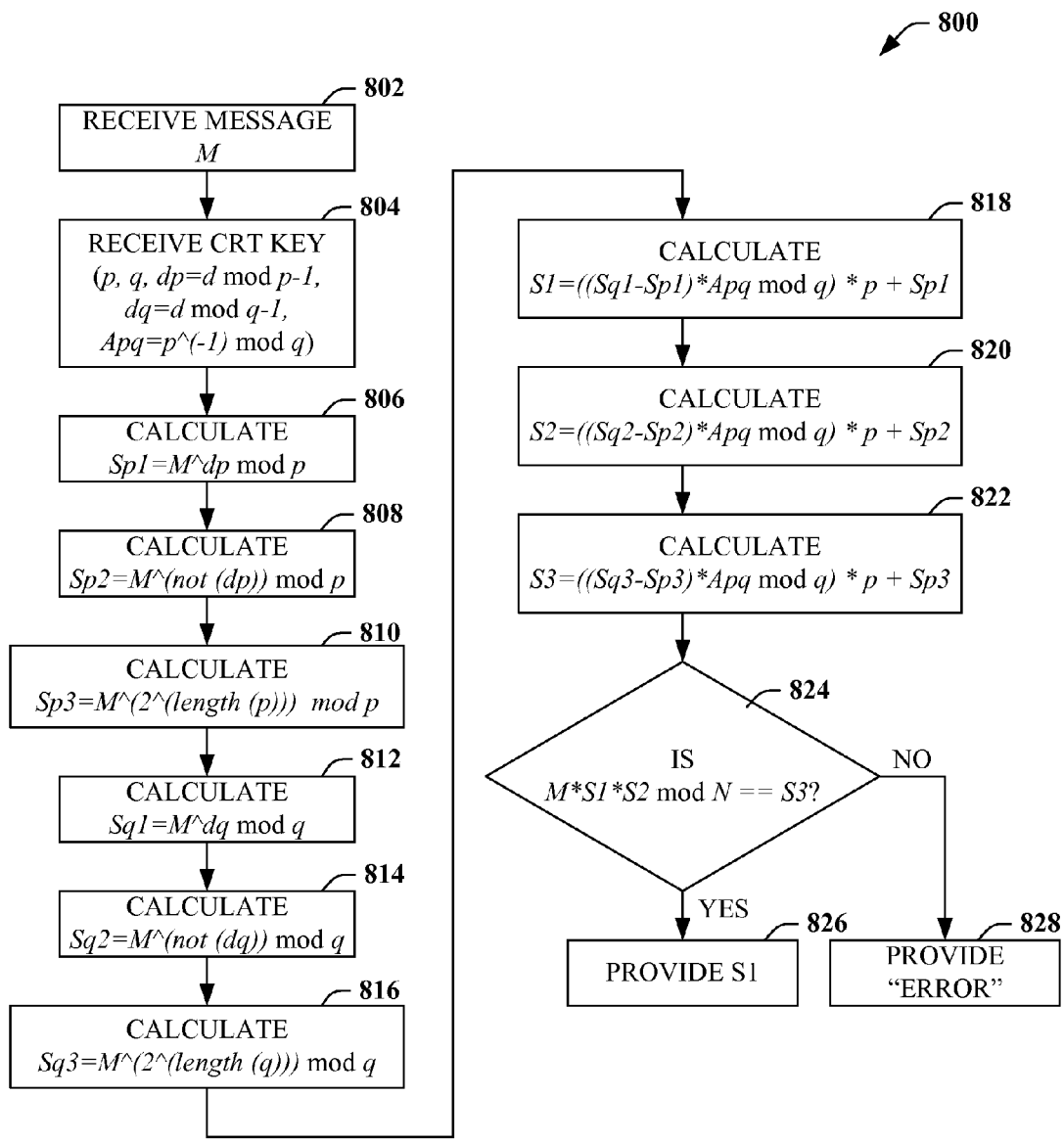
FIG. 8 illustrates a methodology that employs an RSA-CRT-based algorithm to facilitate secure electronic communication of data in accordance with another embodiment of the disclosed subject matter.

Referring to FIG. 8, illustrated is a methodology 800 that
employs RSA-CRT-based exponentiation to facilitate modular exponentiation of data. At 802, a message (e.g., M) can be
received, where the message can be in the form of binary data,
for example. At 804, a CRT key can be received, where the
CRT key can include variables such as p, q, dp=d mod p−1,
dq=d mod q−1, and Apq=p^(−1) mod q, for example. At 806,
variable Sp1 can be calculated, where Sp1 can be calculated
as Sp1=M^dp mod p, for example. At 808, variable Sp2 can be
calculated, where Sp2 can be calculated as Sp2=M^(not(dp))
mod p, for example. At 810, variable Sp3 can be calculated,
where Sp3 can be calculated as Sp3=M^(2^(length (p))) mod
p, for example.

At 812, variable Sq1 can be calculated, where Sq1 can be
calculated as Sq1=M^dq mod q, for example. At 814, variable
Sq2 can be calculated, where Sq 2 can be calculated as
Sq2=M^(not(dq)) mod q, for example. At 816, variable Sq3
can be calculated, where Sq3 can be calculated as Sq3=M^
(2^(length (q))) mod q, for example.

At 818, variable S1 can be calculated, where S1=((Sq1−
Sp1)*Apq mod q)*p+Sp1. At 820, variable S2 can be calculated, where S2=((Sq2−Sp2)*Apq mod q)*p+Sp2. At 822,
variable S3 can be calculated, where S3=((Sq3−Sp3)*Apq
mod q)*p+Sp3.

At 824, a determination can be made as to whether
M*S1*S2 mod N is equivalent to S3. If M*S1*S2 mod N is
equivalent to S3, then at 826, the value for S1 can be provided
as an output, where the output can be the decrypted data or
digital signature associated with the received message M, for
example. Where the input is the message M and the CRT key
(p, q, dp=d mod p−1, dq=d mod q−1, and Apq=p^(−1) mod q),
the output can have a value of $M^d$ mod N (N=p*q), for
example.

If, however, at reference numeral 824 it is determined that
M*S1*S2 mod N is not equivalent to S3, then at 828, "error"
can be provided as an output, where the "error" can indicate
that there was a fault in the exponentiation of the message
data. At this point, methodology 800 can end.

Figure 9:
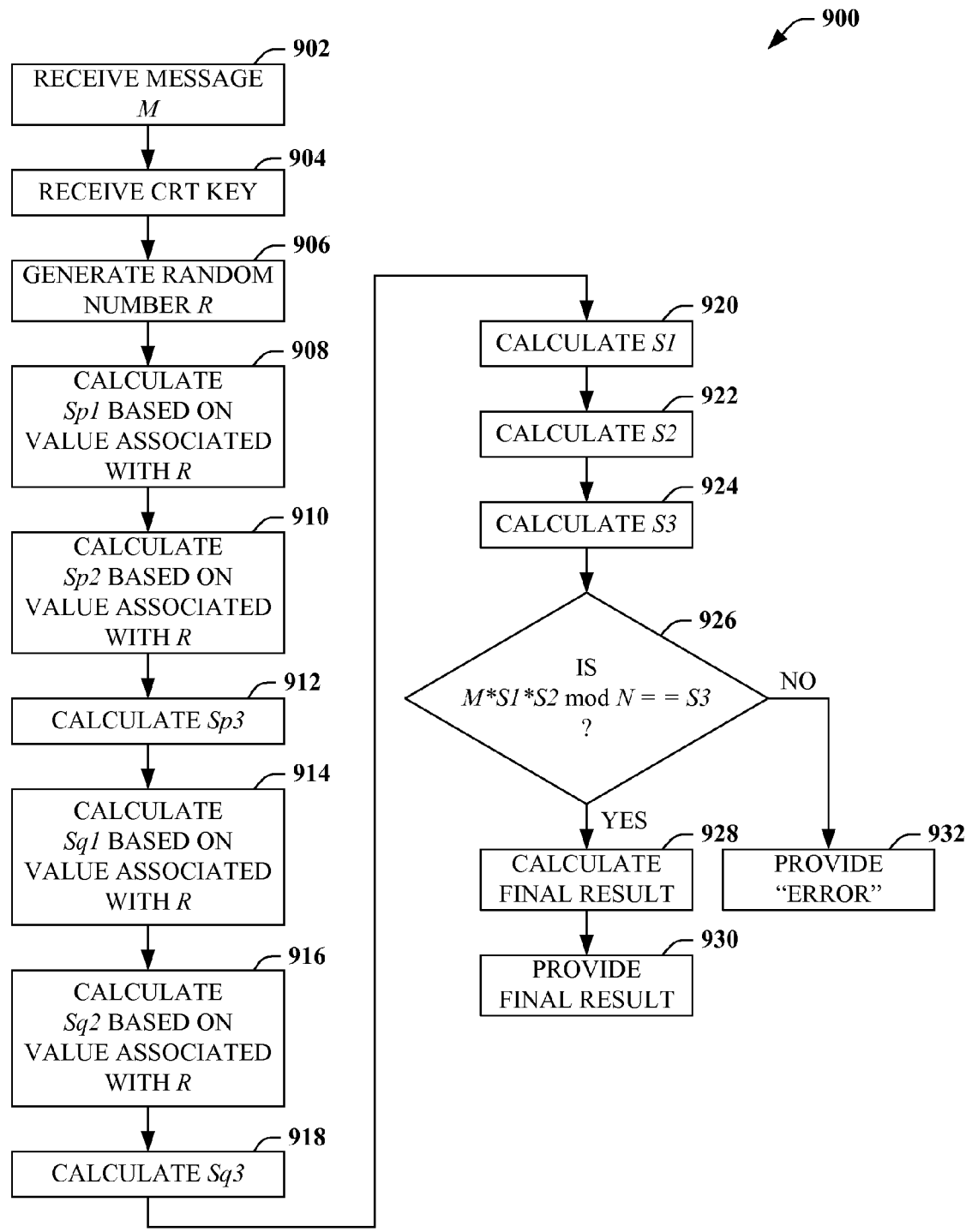
FIG. 9 depicts a methodology that employs an RSA-CRT-based algorithm and randomized exponentiation to facilitate secure electronic communication of data in accordance with another embodiment of the disclosed subject matter.

Turning to FIG. 9, illustrated is a methodology 900 that
employs randomization in an RSA-CRT-based exponentiation to facilitate modular exponentiation of data. At 902, a
message (e.g., M) can be received, where the message can be
in the form of binary data, for example. At 904, a CRT key can
be received, where the CRT key can include variables such as
p, q, dp=d mod p−1, dq=d mod q−1, and Apq=p^(−1) mod q,
for example. At 906, a random number R can be generated,
where the random number R can be a binary number having
a value between 0 and 1023, for example. The random number R can be generated by a random number generator, for
example, and can be generated in a secure manner by the
randomized exponentiation component 104 or can be
received in a secure manner by the randomized exponentiation component 104. At 908, variable Sp1 can be calculated
based on a value associated with the random number. In one
aspect, Sp1 can be calculated as Sp1=R*M^dp mod p, for
example. At 910, variable Sp2 can be calculated based on a
value associated with the random number. In accordance with
one aspect, Sp2 can be calculated as Sp2=R^(−1)*M^(not
(dp)) mod p, for example. At 912, variable Sp3 can be calculated, where Sp3 can be calculated as Sp3=M^(2^(length(p)))
mod p, for example.

At 914, variable Sq1 can be calculated based on a value
associated with the random number. In accordance with one
aspect, Sq1 can be calculated as Sq1=R*M^dq mod q, for
example. At 916, variable Sq2 can be calculated based on a
value associated with the random number. In accordance with
an aspect, Sq2 can be calculated as Sq2=R^(−1)*M^(not (dq))
mod q, for example. At 918, variable Sq3 can be calculated,
where Sq3 can be calculated as Sq3=M^(2^(length (q))) mod
q, for example.

At 920, variable S1 can be calculated, where S1=((Sq1−
Sp1)*Apq mod q)*p+Sp1. At 922, variable S2 can be calculated, where S2=((Sq2−Sp2)*Apq mod q)*p+Sp2. At 924,
variable S3 can be calculated, where S3=((Sq3−Sp3)*Apq
mod q)*p+Sp3.

At 926, a determination can be made as to whether
M*S1*S2 mod N is equivalent to S3. If M*S1*S2 mod N is
equivalent to S3, then at 928, the value of the final result can
be calculated, for example, as FINAL RESULT=S1 *R^(−1)
mod N. At 930, the value of FINAL RESULT can be provided
as an output, where the output can be the decrypted data or
digital signature associated with the received message M, for
example. Where the input is the message M and the CRT key
(p, q, dp=d mod p−1, dq=d mod q−1, and Apq=p^(−1) mod q),
the output can have a value of $M^d$ mod N (N=p*q), for
example.

If, however, at reference numeral 926 it is determined that
M*S1*S2 mod N is not equivalent to S3, then at 932, "error"
can be provided as an output, where the "error" can indicate
that there was a fault in the exponentiation of the message
data. At this point, methodology 900 can end.

In accordance with another aspect, methodology 900 can
be modified such that the random number can be utilized in an
alternative manner. For instance, methodology 900 can proceed as previously described at 902, 904, and/or 906. At 908,
variable Sp1 can be calculated based on a value associated
with the random number. In accordance with one aspect, Sp1
can be calculated as Sp1=R^(−1)*M^dp mod p. At 910, variable Sp2 can be calculated based on a value associated with
the random number. In accordance with an aspect, Sp2 can be
calculated as Sp2=R*M^(not (dp)) mod p. At 912, variable
Sp3 can be calculated as Sp3=M^(2^(length (p))) mod p.

At 914, variable Sq1 can be calculated based on a value associated with the random number (e.g., the inverse of the random number). In one aspect, Sq1 can be calculated as $Sq1=R^{\wedge}(-1)*M^{\wedge}dq \bmod q$. At 916, variable Sq2 can be calculated based on a value associated with the random number. In accordance with an aspect, Sq2 can be calculated as $Sq2=R*M^{\wedge}(not (dq)) \bmod q$. With regard to the acts associated with reference numerals 918, 920, 922, 924, and/or 926, methodology 900 can proceed as previously described herein but with the respective values associated with calculations performed or determinations made based on the alternate utilization of the random number. Turning to reference numeral 926, if it is determined that M*S1*S2 mod N is equivalent to S3, then at 928, the value of the final result can be calculated, for example, as FINAL RESULT=S1*R mod N. At 930, the value of FINAL RESULT can be provided as an output, where the output can be the decrypted data or digital signature associated with the received message M, for example. Given an input that includes a message M and a CRT key (p, q, dp=d mod p−1, dq=d mod q−1, and Apq=p^(−1) mod q), the output can have a value of mod N (N=p*q), for instance.

As utilized herein, terms "component," "system," "interface," and the like, are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . .), optical disks (e.g., compact disk (CD), digital versatile disk (DVD). . .), smart cards, and flash memory devices (e.g., card, stick, key drive . . .). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

Some portions of the detailed description have been presented in terms of algorithms and/or symbolic representations of operations on data bits within a computer memory. These algorithmic descriptions and/or representations are the means employed by those cognizant in the art to most effectively convey the substance of their work to others equally skilled. An algorithm is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the foregoing discussion, it is appreciated that throughout the disclosed subject matter, discussions utilizing terms such as processing, computing, calculating, determining, and/or displaying, and the like, refer to the action and processes of computer systems, and/or similar consumer and/or industrial electronic devices and/or machines, that manipulate and/or transform data represented as physical (electrical and/or electronic) quantities within the computer's and/or machine's registers and memories into other data similarly represented as physical quantities within the machine and/or computer system memories or registers or other such information storage, transmission and/or display devices.

Figure 10:
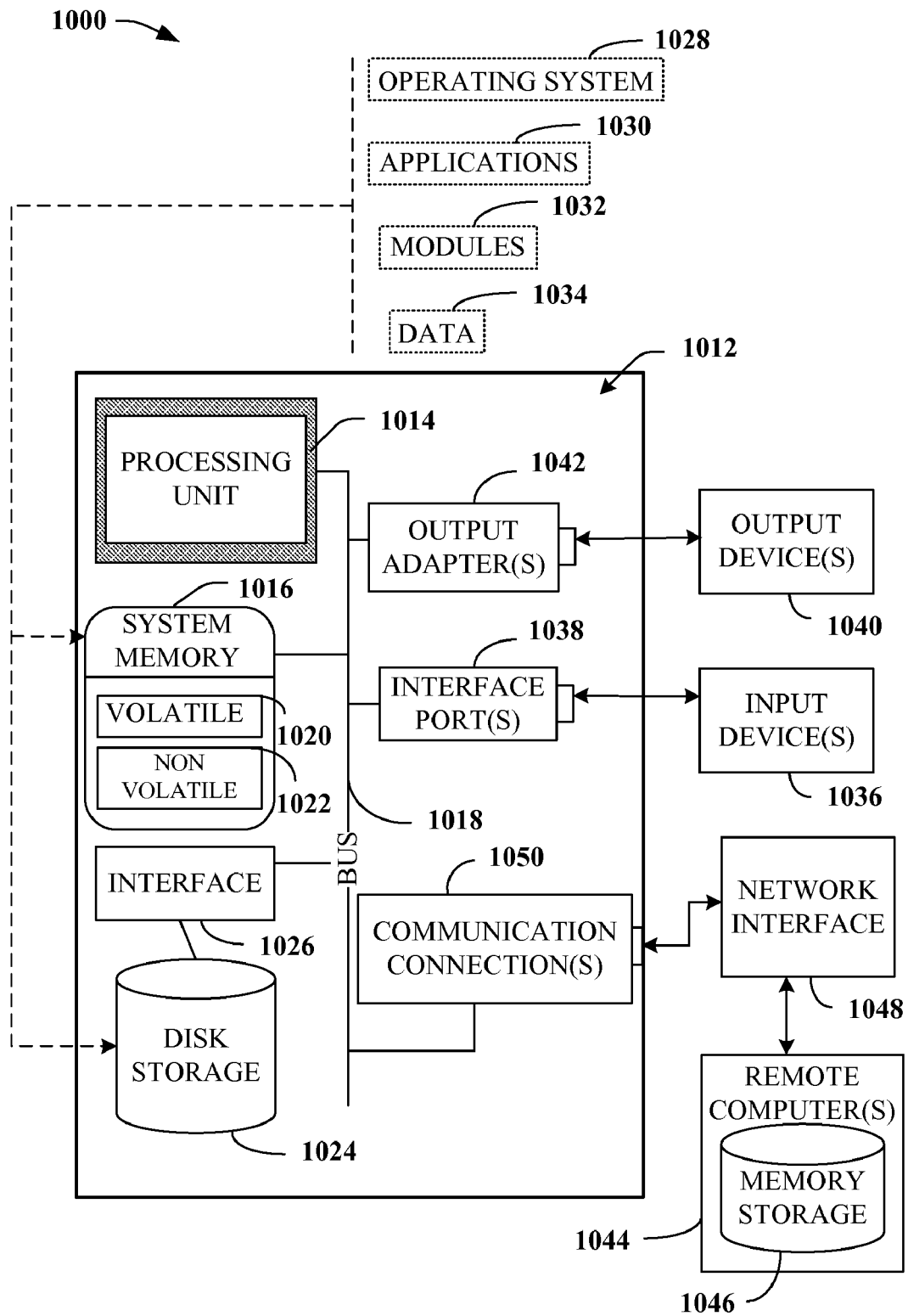
FIG. 10 is a schematic block diagram illustrating a suitable operating environment.
Figure 11:
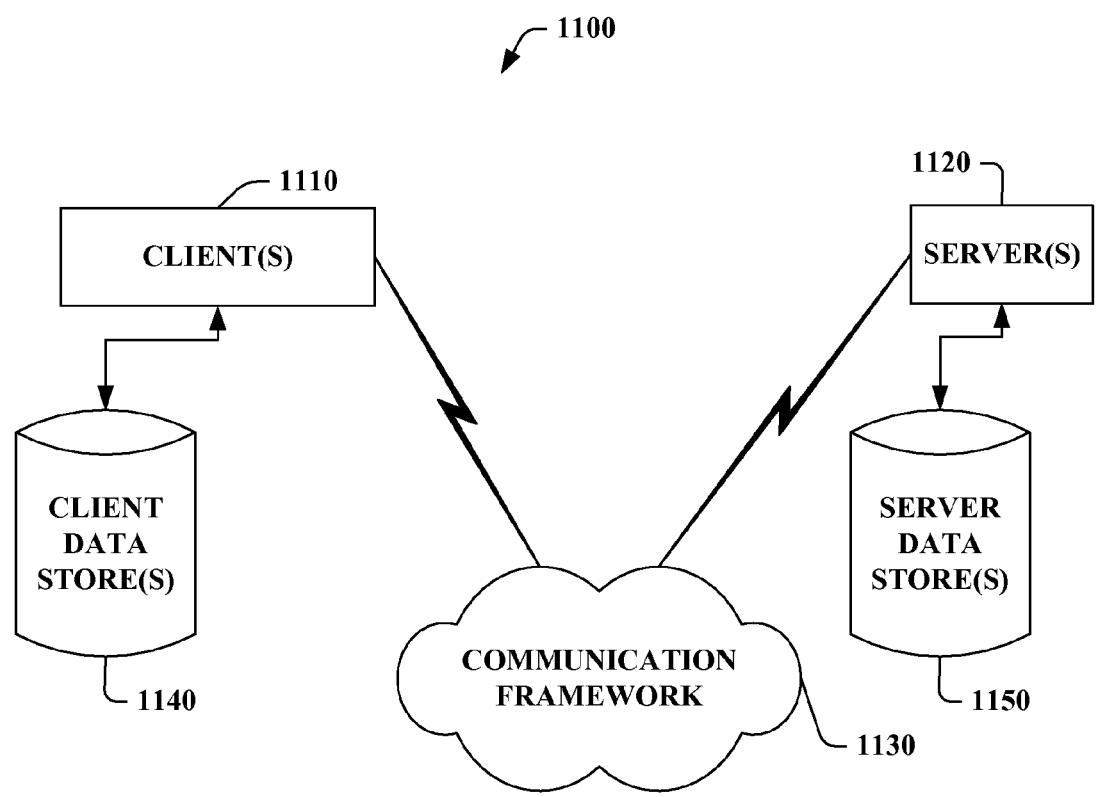
FIG. 11 is a schematic block diagram of a sample-computing environment.

In order to provide a context for the various aspects of the disclosed subject matter, FIGS. 10 and 11 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on standalone computers. In a distributed computing environment, program modules may be located in both local and remote memory storage devices.

With reference to FIG. 10, a suitable environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include ROM, PROM, EPROM, EEPROM, or flash memory. Volatile memory 1020 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example, a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used, such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

FIG. 11 is a schematic block diagram of a sample-computing environment 1100 with which the subject innovation can interact. The system 1100 includes one or more client(s) 1110. The client(s) 1110 can be hardware and/or software (e.g., threads, processes, computing devices). The system 1100 also includes one or more server(s) 1120. Thus, system 1100 can correspond to a two-tier client server model or a multi-tier model (e.g., client, middle tier server, data server), amongst other models. The server(s) 1120 can also be hardware and/or software (e.g., threads, processes, computing devices). The servers 1120 can house threads to perform transformations by employing the subject innovation, for example. One possible communication between a client 1110 and a server 1120 may be in the form of a data packet transmitted between two or more computer processes.

The system 1100 includes a communication framework 1130 that can be employed to facilitate communications between the client(s) 1110 and the server(s) 1120. The client(s) 1110 are operatively connected to one or more client data store(s) 1140 that can be employed to store information local to the client(s) 1110. Similarly, the server(s) 1120 are operatively connected to one or more server data store(s) 1150 that can be employed to store information local to the server(s) 1120.

What has been described above includes examples of aspects of the disclosed subject matter. It is, of course, not possible to describe every conceivable combination of components or methodologies for purposes of describing the disclosed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has," or "having," or variations thereof, are used in either the detailed description or the claims, such terms are intended to be inclusive in a manner similar to the term "comprising" as "comprising" is interpreted when employed as a transitional word in a claim.

What is claimed is:

1. A system, comprising:
   at least one processor;
   a memory communicatively coupled to the at least one processor, the memory having stored therein computer-executable instructions configured to implement the system including:
   a cryptographic component configured to secure data in accordance with a cryptographic protocol; and
   a randomized exponentiation component configured to at least one of decrypt the data or generate a digital signature, based at least in part on an exponentiation of the data with an exponent associated with the data based at least in part on a cryptographic algorithm comprising a right-to-left square-and-multiply algorithm, where a value of the data is randomized based at least in part on a value of a random number, wherein the randomized exponentiation component is further configured to perform a result values check after the exponentiation of the data with the exponent to determine whether the exponentiation is performed without error, and provide a final result of the exponentiation as an output when there is no error in the exponentiation of the data and provide an output comprising an error message when there is an error in the exponentiation of the data.

2. The system of claim 1, the data is received by the cryptographic component and the value of the data is multiplied by the value of the random number.

3. The system of claim 1, the value of the random number is different for each execution by the cryptographic component.

4. The system of claim 1, the randomized exponentiation component is further configured to calculate an inverse value of the random number, perform the result values check by an analysis of a preliminary result after the exponentiation of the data with the exponent to determine whether there is an error in the exponentiation of the data, and, when it is determined that there is no error in the exponentiation of the data, calculate the final result based at least in part on multiplication of the preliminary result by the inverse value of the random number.

5. The system of claim 1, the randomized exponentiation component is further configured to perform calculations associated with the exponentiation of the data in accordance with a Chinese Remainder Theorem algorithm.

6. The system of claim 1, the randomized exponentiation component is further configured to utilize at least one of Montgomery multiplication or Montgomery exponentiation to compute at least one of the random number or a modular inverse of the random number.

7. The system of claim 1, the randomized exponentiation component is further configured to:
   perform the result values check by an analysis of a preliminary result after the exponentiation of the data with the exponent to determine whether there is an error in the exponentiation of the data, wherein the randomized exponentiation component multiples a first variable of the preliminary result by a second variable of the preliminary result and by the value of the data to generate a first values check result,
   compare the first values check result to a third variable of the preliminary result to determine whether the first values check result and the third variable are equivalent, wherein the third variable is based at least in part on repeated squaring of the value of the data throughout the exponentiation of the data, and
   when it is determined that the first values check result and the third variable are equivalent, identify that there is no error in the exponentiation of the data, and calculate the final result based at least in part on the inverse value of the random number, and when it is determined that the first values check result and the third variable are not equivalent, identify that there is an error in the exponentiation of the data and provide the output the error message.

8. The system of claim 1, further comprising a computation component that is further configured to perform parallel operations associated with exponentiation of the data based at least in part on the exponent.

9. The system of claim 1, further comprising:
   a host processor configured to perform operations on data;
   a memory configured to store data, the cryptographic component is further configured to receive data from at least one of the host processor or the memory.

10. The system of claim 1, the exponent is associated with one of RSA cryptography, elliptic curve cryptography, Diffie-Hellman cryptography, Digital Signature Algorithm (DSA) cryptography, or Elliptic Curve DSA cryptography.

11. An electronic device comprising the system of claim 1, the electronic device is one of a computer, a cellular phone, a digital phone, a video device, a smart card, a personal digital assistant, a television, an electronic game, a digital camera, an electronic organizer, an audio player, an audio recorder, an electronic device associated with digital rights management, a Personal Computer Memory Card International Association (PCMCIA) card, a trusted platform module, a Hardware Security Module, a set-top box, a secure portable token, an Universal Serial Bus (USB) token, a key token, a secure memory device with computational capabilities, or an electronic device with a tamper-resistant chip.

12. A method, comprising:
    employing at least one processor executing computer executable instructions stored on a computer readable storage medium to implement the following acts:
    exponentiating data using an exponent based at least in part on a cryptographic algorithm comprising a right-to-left square-and-multiply algorithm, a value of the data is randomized based at least in part on a random number;
    performing a result values check on preliminary exponentiation results generated after exponentiating the data to determine whether the exponentiation is performed without error; and
    providing an output, wherein, when a result of the result values check indicates there is no error in the exponentiation of the data, the output comprises a final result of the exponentiation calculated based at least in part on an inverse value of the random number and a portion of the preliminary exponentiation results, and wherein, when the result of the result values check indicates there is an error in the exponentiation of the data, the output is an error message.

13. The method of claim 12, further comprising:
    generating the random number; and
    multiplying the value of the data with a value associated with the random number.

14. The method of claim 12, further comprising:

receiving the data associated with a message;

receiving the exponent;

setting initial values of variables associated with exponentiation of the data using the exponent;

scanning the bits of the exponent during exponentiation from a least significant bit to a most significant bit in accordance with the right-to-left square-and-multiply algorithm;

exponentiating the data using the exponent to generate the preliminary exponentiation results; and determining if the preliminary exponentiation results are without error.

15. The method of claim 14, further comprising:

exponentiating the data with the exponent in accordance with a Chinese Remainder Theorem.

16. The method of claim 14, further comprising:

calculating a variable Sp1 as at least one of Sp1=R*M^dp mod p or Sp1=R^(−1) *M^dp, where R is the random number, M is the data associated with the message, p is a prime number, dp=d mod p−1, d represents the exponent, and mod represents a modulo operation;

calculating a variable Sp2 as at least one of Sp2=R^(−1) *M^(not (dp)) mod p or Sp2=R*M^(not (dp)) mod p;

calculating a variable Sp3 as Sp3=M^(2^(length (p))) mod p;

calculating a variable Sq1 as at least one of Sq1=R*M^dq mod q or Sq1=R*M^dq mod q, where q is a prime number and dq=d mod q−1;

calculating a variable Sq2 as at least one of Sq2=R^(−1) *M^(not (dq)) mod q or Sq2=R*M^(not (dq)) mod q;

calculating a variable Sq3 as Sq3=M^(2^(length (q))) mod q;

calculating a variable S1 as S1=((Sq1−Sp1)*Apq mod q)*p+Sp1 where Apq=p^(−1) mod q;

calculating a variable S2 as S2=((Sq2−Sp2)*Apq mod q)*p+Sp2;

calculating a variable S3 as S3=((Sq3−Sp3)*Apq mod q)*p+Sp3;

determining if the value of M*S1*S2 mod N is equivalent to the value of S3; and at least one of:

calculating a final result as at least one of S1* R^(−1) mod N or S1*R mod N if the value of M*S1*S2 mod N is equivalent to the value of S3, and providing the final result as an output, or providing "error" as an output if M*S1*S2 mod N is not equivalent to the value of S3.

17. The method of claim 12, further comprising:

setting initial values for variables R0, R1, A, and i as A=g, i=0, R0 equal to at least one of R or R^(−1), and R1 equal to at least one of R^(−1) or R, wherein g is the data associated with a message and i is an iteration number;

scanning an exponent bit of the exponent based at least in part on the iteration number i;

at least one of:

calculating R0=R0*A when the value of the exponent bit is 1, or calculating R1=R1*A when the value of the exponent bit is 0;

calculating A =A^2;

determining if the value of R0*R1*g is equivalent to the value of A after each bit of the exponent is scanned;

determining if all exponent bits of the exponent are scanned;

incrementing the iteration number i if all exponents bits are not scanned; and at least one of:

calculating a final result as at least one of R0*R^(−1) if the initial value of R0=R and the initial value of R1=R^(−1) or R0*R if the initial value of R0=R^(−1) and the initial value of R1=R, and providing the final result as an output, if R0*R1*g is equivalent to the value of A after all of the exponent bits are scanned, or providing "error" as an output, if R0*R1*g is not equivalent to the value of A after all of the exponent bits are scanned.

18. The method of claim 12, further comprising:

calculating at least one of the random number or an inverse of the random number using a Montgomery algorithm.

19. A computer readable storage medium comprising computer executable instructions that, in response to execution by a computer system, cause the computing system to perform operations comprising:

randomizing a binary value associated with information based at least on part on a random number to generate a randomized binary value;

exponentiating the randomized binary value with an exponent based at least in part on a right-to-left square-and-multiple algorithm;

performing a result values check on preliminary results generated after exponentiating the data to determine whether the exponentation of the randomized binary value is performed without error; and providing an output, wherein, when a result of the result values check indicates there is no error in the exponentiation of the randomized binary value, the output comprises a final data value of the exponentiation calculated based at least in part on an inverse value of the random number and a portion of the preliminary results, and wherein, when the result of the result values check indicates there is an error in the exponentiation of the randomized binary value, the final data value is not calculated and the output comprises specified data other than the final data value.

20. The computer readable storage medium of claim 19, further comprising:

generating the random number;

receiving the information;

performing computations associated with the exponentiation based at least in part on the right-to-left square-and-multiply exponentiation algorithm;

comparing a first portion of the preliminary results to a second portion of the preliminary results to determine whether the exponentiation of the randomized binary value is performed without error; and determining the error occurred in the exponentiation when the first portion is not equivalent to the second portion.

* * * * *